United States Patent

Kalman

[15] 3,645,399
[45] Feb. 29, 1972

[54] FILTERING PROCESS AND APPARATUS

[72] Inventor: Peter G. Kalman, 51 Compayne Gardens, London, N.W. 6, England

[22] Filed: Sept. 3, 1969

[21] Appl. No.: 854,943

[30] Foreign Application Priority Data

Sept. 3, 1968 Great Britain ..................41,915/68
Mar. 25, 1969 Great Britain ..................15,667/69
May 13, 1969 Great Britain ..................24,416/69

[52] U.S. Cl..............................210/77, 210/97, 210/184, 210/387, 210/401
[51] Int. Cl.....................................B01d 29/02
[58] Field of Search................210/71, 77, 184, 387, 401, 210/97

[56] References Cited

UNITED STATES PATENTS

| 3,084,987 | 4/1963 | Bounin | 210/401 X |
|---|---|---|---|
| 3,091,335 | 5/1963 | Goard | 210/401 X |
| 3,190,451 | 6/1965 | Holland | 210/401 X |
| 3,263,816 | 8/1964 | Krynski | 210/401 X |
| 3,358,834 | 12/1967 | El Hindi | 210/401 X |
| 1,806,701 | 5/1931 | Moreton | 210/184 |
| 2,218,453 | 10/1940 | Mickle | 210/387 X |
| 2,675,129 | 4/1954 | Doubleday | 210/387 X |
| 3,032,545 | 5/1962 | Renberg | 210/77 X |
| 3,138,015 | 6/1964 | Avery | 210/387 X |
| 3,310,172 | 3/1967 | Beduhn | 210/387 X |
| 3,471,017 | 10/1969 | Kalman | 210/77 X |

*Primary Examiner*—John Adee
*Attorney*—Bacon & Thomas

[57] ABSTRACT

A process for filtering a substance flowing through a passageway in which a filter band is introduced across the passageway through slotted inlet and outlet ports, a sealing substance different from that being filtered is introduced into the ports, temperature conditions are established in the ports such as to cause the sealing substance therein to solidify to form rigid sealing plugs, and, when desired, the filter is moved through the inlet and outlet ports to introduce a fresh part of the filter across the passageway under such conditions in the ports that the sealing plugs are maintained. Also a filtering apparatus having a passageway through which the substance to be filtered can flow, slotted inlet and outlet ports flanking the passageway through which a filter band is introduced, the ports being cooled so that substance entering them is solidified to form sealing plugs, and a backing support consisting of a rotary drum or an endless train of rollers for supporting the filter band across the passageway.

31 Claims, 20 Drawing Figures

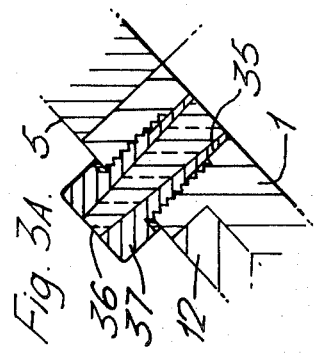
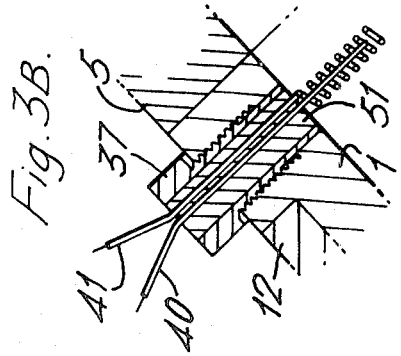
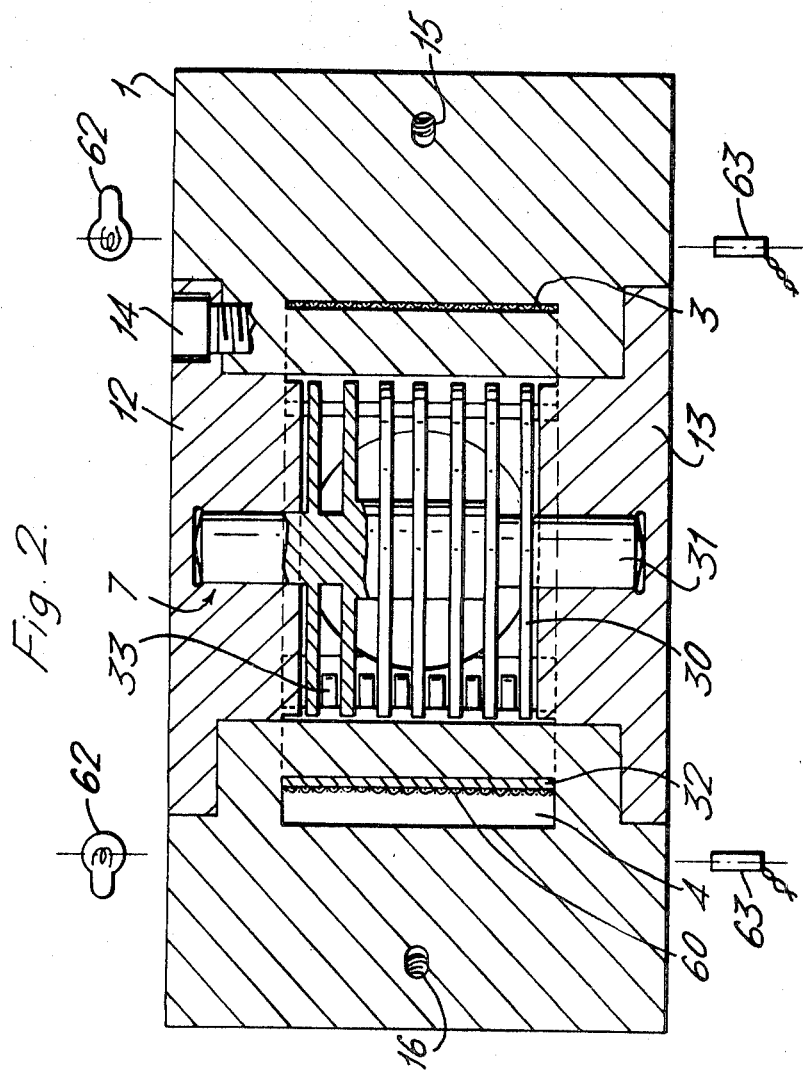

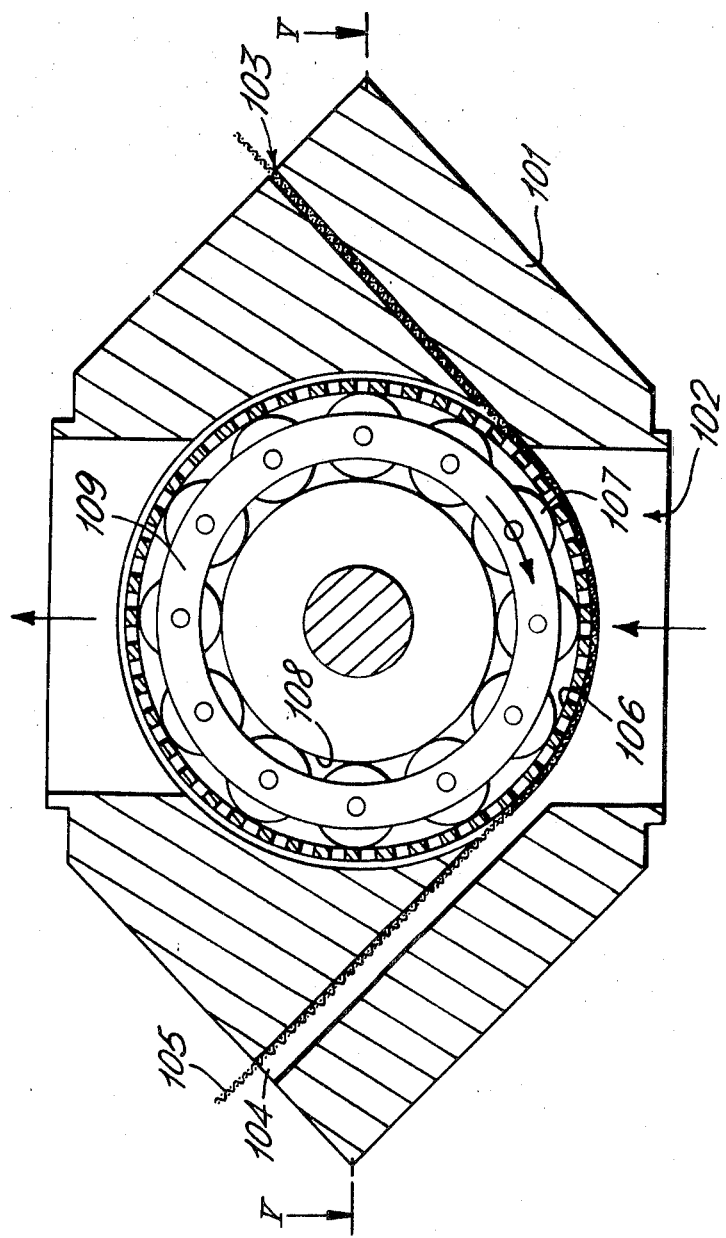

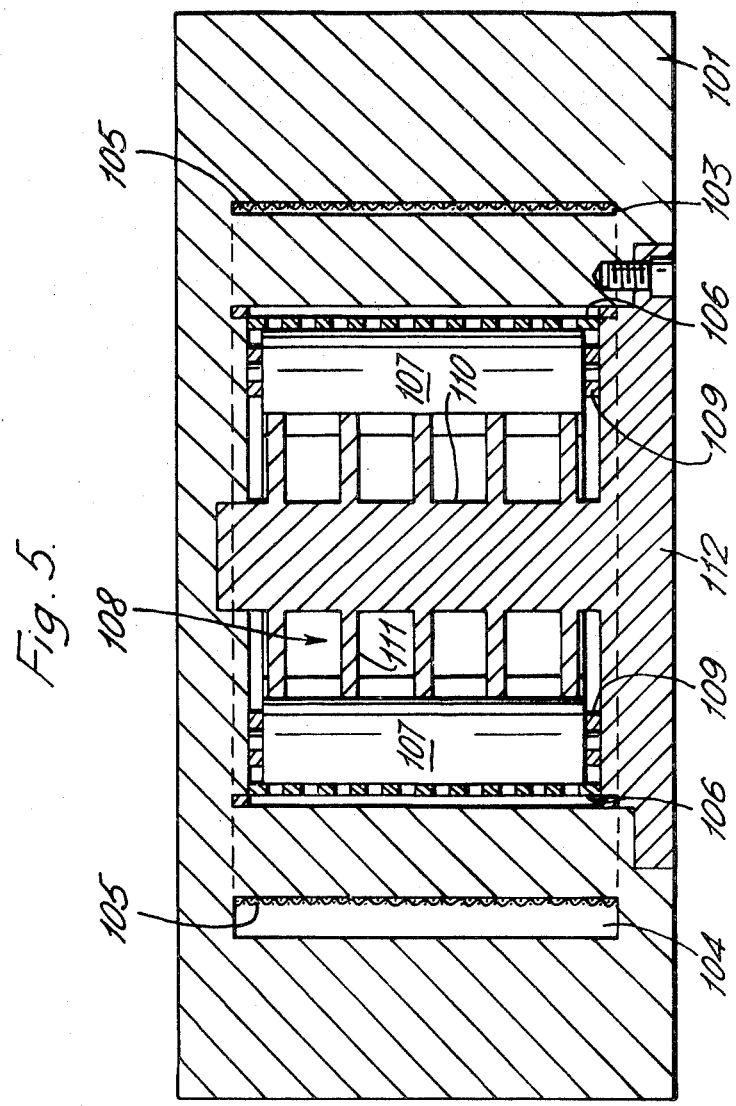

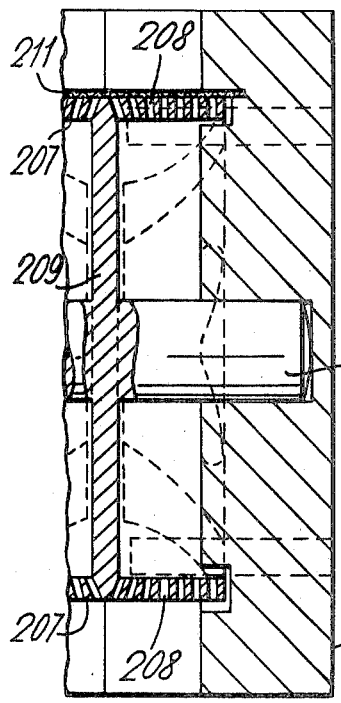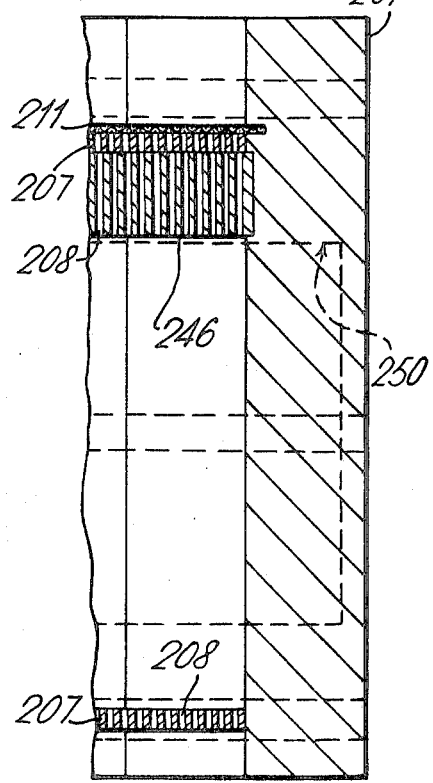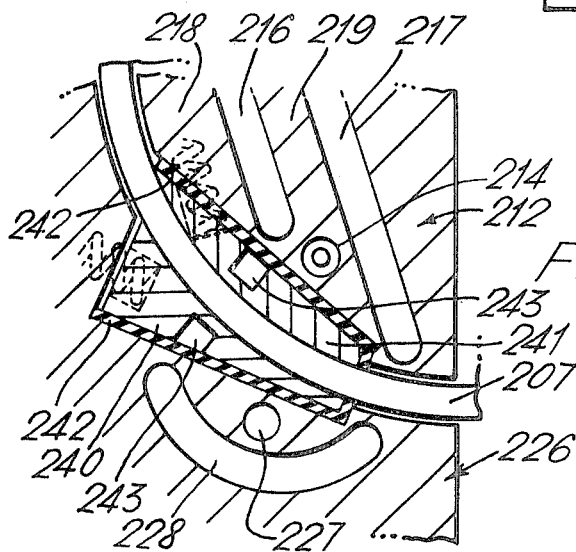

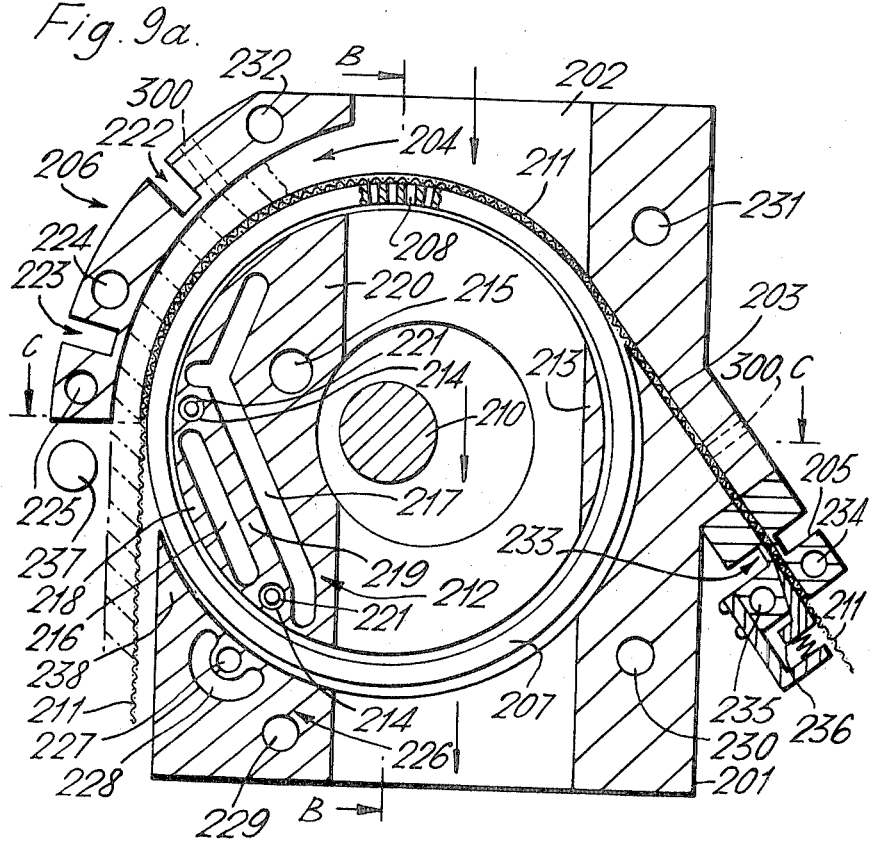
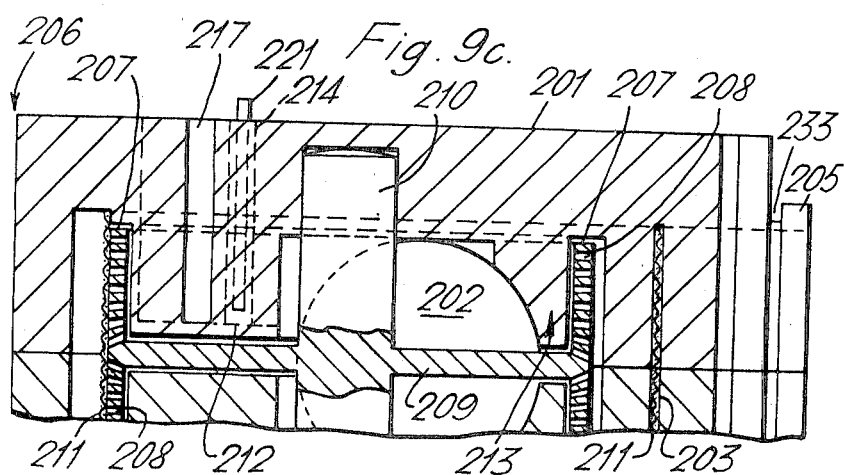

Peter G. Kalman
INVENTOR

Bacon & Thomas
ATTORNEYS

FILTERING PROCESS AND APPARATUS

This invention concerns improvements in or relating to filtering and more particularly relates to a process and an apparatus for filtering a fluid substance flowing through a passage by the introduction of a filter across such passage.

U.S. Pat. application No. 647,435 now U.S. Pat. No. 3,471,017 discloses and claims a process for filtering a substance, particularly though not exclusively a heat-softened plastics material, which comprises the steps of introducing a filter in the form of a filter band or ribbon into a passage through which the substance to be filtered is flowing by passing it through inlet and outlet ports flanking the passage so that a part of the filter extends across the passage, forcing the substance to be filtered through the filter part in the passage so as to filter the substance while providing at the inlet and outlet ports conditions such as to result in the formation within the ports of sealing plugs of the said substance of adequate rigidity to prevent substantial leakage at the ports, and, when desired, effecting movement of the filter through the inlet and outlet ports under conditions providing for self-maintenance of the sealing plugs to introduce a fresh part of the filter band or ribbon into the passage. The necessary conditions at the inlet and outlet ports for movement of the filter are achieved according to a preferred method of carrying out the process by utilizing the hydrostatic pressure of the substance within the passage acting on the sealing plug within the outlet port to move the filter as a result of controlled extrusion of the outlet sealing plug and controlling such movement by regulating the temperature of at least one of the sealing plugs.

The above-mentioned specification also discloses and claims a filtering device including a body defining a passage through which a substance to be filtered can be caused to flow, and slotted inlet and outlet ports flanking the passage through which a filter in the form of a band or ribbon can be passed and moved to introduce different parts of said filter across said passage, said ports being adapted for the formation therein, in use, of sealing plugs of the substance being filtered permitting movement of said filter through said ports without substantial leakage of said substance.

As discussed in the above-mentioned specification the process and apparatus disclosed and claimed therein are advantageous in that they permit replacement of clogged filter areas with fresh filter areas of the same filter band or ribbon, either continuously or in steps, and no interruption of the flow of the substance in the passage is occasioned which has considerable benefit in the extrusion of long lengths of plastics tubing for example. The previous necessity of digging out of spent filters from their enclosures to change a clogged filter in a plastics extrusion line is avoided and automatic filter changing can be achieved.

In certain circumstances it is either inconvenient or impractical to form sealing plugs of the material being filtered, for example the characteristics of the substance being filtered may be such that sealing plugs thereof can be formed only with difficulty and at substantial cost, or the substance being filtered may have noxious qualities, e.g., solvents giving off poisonous vapors, so that it might prove harmful to personnel if the substance were to escape even in small quantities from the inlet or outlet port. Also, for example, if water is to be filtered it may prove prohibitively expensive to cool the inlet and outlet ports sufficiently to achieve the formation therein of ice sealing plugs; furthermore water has a definite transition temperature between its liquid and solid (ice) states and no intermediate viscous states are realized which, as discussed hereinafter, would prove useful for regulating the movement of the filter band or ribbon.

According to this invention therefore it is proposed to form the sealing plug within at least one of said ports of a flowable substance different from that of the substance being filtered since in this way it will generally be possible to avoid the above-mentioned difficulties. For example in the filtering of water it is convenient, rather than to employ cooling to form ice sealing plugs, to employ paraffin wax, which is immiscible with water, as the sealing substance, the wax being introduced into the ports in heated liquid state and solidified therein to form wax sealing plugs merely by slight cooling, for example by circulation of cold water through cooling ducts or channels in the walls of the ports.

According to this invention therefore there is provided a process of filtering a substance flowing through a passage including the steps of introducing a filter in the form of a filter band or ribbon by passing it through slotted inlet and outlet ports flanking said passage so that a part of the filter extends across said passage, forcing the substance through the filter part in the passage to filter said substance while providing conditions at said inlet and outlet ports resulting in the formation within said ports of sealing plugs of a flowable sealing substance of adequate rigidity to prevent substantial leakage at said ports of the substance being filtered and, when desired, effecting movement of said filter through said ports under conditions providing for self-maintenance of the said sealing plugs to introduce another part of said filter band or ribbon into said passage, the flowable sealing substance forming the sealing plug within at least one of said ports being different from the substance being filtered.

Generally in carrying out the process according to this invention a sealing substance different from the substance being filtered will be employed at both the inlet and outlet ports. However in certain circumstances the use of a different sealing substance at one port only may be sufficient. Thus, for example, since the movement of the filter band or ribbon necessary to introduce a fresh part thereof into the passage is opposite to the direction of flow required for substance to leak from the inlet port and the sealing plug is self-maintained during such movement it can be arranged, at least by moving the filter continuously, that little or no substance being filtered approaches the free end (i.e., the end remote from the said passage) of the inlet port so that if the avoidance of the leakage of noxious vapors to atmosphere is the problem, it may be acceptable only to provide a sealing substance different from the substance being filtered at the outlet port where an eflux of the substance forming the outlet sealing plug will occur with movement of the filter band or ribbon.

In general a sealing substance other than the substance being filtered will be selected which is compatible with the substance being filtered in the sense that it will not react chemically with the substance being filtered, will not mix with it and is not soluble in such substance. It is also preferred to use as sealing substance a substance having a different (and preferably a higher) specific gravity that the substance being filtered since the action of gravity will then tend to separate the substances. A stable interface will then be established between the substance of the sealing plug and the substance being filtered. However it is possible, if desired, for the sealing plug substance to be used as a means of introducing an additive or treating agent into the substance being filtered.

It will, of course, be necessary to maintain an adequate supply of sealing plug substance other than the substance being filtered at said sealing port(s). Sealing plug substance will normally be lost through controlled extrusion occuring with movement of the filter particularly at the outlet port. Replenishment is readily achieved by suitable pumping means. Preferably makeup of sealing substance is made automatic by the provision of suitable means for detecting the presence or absence of sealing plug substance at an appropriate location in the sealing port, such detecting means controlling the operation of the pumping means. Sealing plug substance escaping from said ports can be collected, itself filtered and recirculated, if desired, on a continuous basis.

It is to be understood that sealing plug substances different from the substance being filtered and from one another may be provided at the inlet and outlet ports respectively. Furthermore a barrier medium may be introduced between a sealing plug substance forming the sealing plug at one port and the substance being filtered if for any reason a separation of the two substances is required. Such barrier medium, unless possibly used as a means of introducing an additive or treating agent into said substance being filtered, would not normally require replenishment in operation of the process since it is trapped between the sealing plug substance and the substance being filtered. Means however would be provided for the introduction of such medium and its presence in adequate amount could be detected automatically for automatic replenishment whenever this should prove necessary.

This invention also provides a filtering device including a body defining a passage through which a substance to be filtered can be caused to flow and slotted inlet and outlet ports flanking said passage through which a filter in the form of a band or ribbon can be passed and moved to introduce different parts of said filter across said passage, said ports being adapted for the formation therein, in use, of sealing plugs of a flowable sealing substance permitting movement of said filter through said ports without substantial leakage of said substance being filtered, a bore in said body communicating with one of said ports at a point downstream of said passage in relation to the direction of flow of substance to be filtered entering said one port from said passage, said bore serving for the introduction into said one port of a flowable sealing substance other than the substance to be filtered.

The other of said inlet and outlet ports may also communicate with a second bore of like function to the bore communicating with the said one port or simply be adapted for the formation therein of a sealing plug of the substance being filtered.

As in the case of the filtering apparatus disclosed and claimed in the specification of U.S. Pat. NO. 3,471,017 the substance to be filtered generally is maintained at an appropriate temperature in the passage defined within said body and the operative sections of the input and outlet ports are kept within a (usually lower) means temperature range appropriate to the formation and self-maintenance of sealing plugs of adequate rigidity to prevent substantial leakage. The movement of one of the sealing plugs within its port depends upon the hydrostatic pressure of the substance to be filtered, on the force exerted on the plug by the filter ribbon passing through or besides it, and particularly is dependent also on the shape, curvature and aperture size of the passage within the sealing port through which the plug passes and also on the temperature distribution and the corresponding viscoelastic and adhesive properties established within the plug and at its boundaries. All these conditions influence the formation of and speed at which the sealing plug passes through its containing port and can be employed, singly or in combination, to control its movement. The filter band or ribbon may advantageously be embedded in the sealing plug in the outlet port and in this case the rate at which the filter is moved through the filtering passage can be regulated easily by controlling the rate of extrusion of the sealing plug which, in this case, forwards it.

It will be appreciated that the improved process of this invention can be employed for filtering any material so long as a suitable sealing substance capable of solidification when cooled is available so that substantially pressure tight sealing plugs can be formed within the sealing ports. When a substance having a well-defined solidification temperature is used in apparatus in accordance with the invention for forming the sealing plugs then the rate of filter ribbon forwarding depends primarily on the rate at which the outer skins of the initially solid sealing plugs melt into a liquid state incapable of supporting stresses other than hydrostatic pressure thus permitting the still solid cores of these plugs to traverse the channels within the sealing ports. When the sealing substance is such as to lose its fully solid consistency more gradually on heating, then the mechanism whereby the plugs within the sealing ports control the forwarding speed of the filter ribbon is believed to be predominantly that of viscoelastic strain relaxation. Some materials, such as plastics, invariably possess a somewhat wide transition zone within which the strain release rate and the corresponding rate of overall deformation are controlled by temperature dependent viscoelastic relaxation. As the gradual extrusion of the semisolid plug within the exit port is believed to be accompanied by laminar shear awakened within the plug at least in part by interface drag generated at the walls of the exit channel and relaxing in time at a temperature-controlled rate, hence surface adhesion between the plug and the exit port may also be expected to play a part in determining the forwarding rate of the plug and hence of the filter ribbon. Thus the rate of filter ribbon forwarding can readily be controlled provided only that the outlet channel is of such a geometry that the passage of the semirigid plug along it awakens viscoelastic stresses and corresponding strains within the plug which relax in a temperature and time dependent manner. For example, a localized obstruction, such as a constriction in the outlet channel suffices to slow down substantially the forwarding of a viscoelastic, near-solid plug and in conjunction with temperature control in the critical region of the constriction may be used to control the forwarding rate. Regardless of theory of operation, it is observed that, when the filter band or ribbon is forwarded in apparatus according to the invention by allowing the pressure of the substance being filtered to act on inlet and outlet plugs of unequal cross-sectional areas, the rate of forwarding is strongly dependent on the temperature of at least one of the plugs and this temperature may then be regulated so as to afford control over the rate of filter ribbon forwarding.

It will be clear that a similarly effective way of operating the invention consists in altering the geometry of both inlet and outlet ports or at least of one of them and controlling the rate of filter ribbon forwarding in this manner without the necessity of temperature changes. An example of an exit port embodying such variable geometry is provided with a gate which is pivoted by means of a pin to a frame; the port is kept at a suitable constant temperature by coolant flowing in channels and the rate of filter ribbon forwarding may be controlled by means of an adjusting screw which determines the inclination of the gate. Alternatively a sliding wedge may be employed which restricts the exit channel of the outlet port to an adjustable extent. A further form of outlet port of simple but adjustable geometry has grubscrews protruding into the outlet channel and is suitable for use with a plastics sealing medium the grubscrews being arranged to plough grooves of adjustable depths into the semirigid plug passing through the outlet channel.

The above examples of alternative sealing ports achieve a controlled forwarding rate of the sealing plug by varying the temperature of the plug or by altering the channel cross section or by relying on both measures simultaneously. A further alternative in which retardation of the plug is brought about by changing its curvature is possible. As a semirigid sealing plug traverses for example a wavy slot in the outlet port the curvature at a given locality within the moving plug undergoes changes so that bending stresses are produced within it. These stresses are brought about by the hydrostatic pressure exerted on the plug by the substance being filtered and their rate of relaxation, here governed by the balance of heat inflow and heat outflow, determines the rate of filter screen changing. It will be clear that this rate could also be controlled by utilizing an inlet or outlet port of variable curvature operating at a suitable constant temperature. It will be understood that while the various examples of sealing port construction discussed serve to illustrate the way in which outlet ports of various configurations may be used to afford control of the filter forwarding speed, the same considerations apply also to the inlet port which may be employed equally readily to control the rate of filter screen forwarding provided only that the inlet channel within the inlet port permits sufficient controlled outward leakage to allow continual replenishment of the material forming the inlet sealing plug.

The rate at which the filter band or ribbon is forwarded may be further influenced where desirable by causing direct external forces to act on the filter band or ribbon; for example the forwarding movement may be caused or increased by pulling at the emerging end of the filter band or ribbon, or a supporting perforated band of stainless steel for example may be moved with the filter through the inlet port, across the passage, and out of the outlet port to help move and support the filter.

It has been found in apparatus, such as is disclosed in the complete specification of U.S. Pat. No. 3,471,017 wherein a filter band or ribbon is disposed across a passageway to filter a substance flowing therethrough the filter passing into and out of the passageway via slotted inlet and outlet ports each adapted for the formation therein of sealing plugs of a flowable sealing substance (the substance being filtered for example, or another substance) of adequate rigidity to prevent leakage from the ports while permitting forwarding movement of the filter, that as the filter becomes progressively clogged with impurities filtered out of the stream of substance the force upon the part of the filter in the passage due to the hydrostatic pressure of the substance being filtered rises to such an extent that in some cases of heavy contamination it is only with difficulty that the filter can be forwarded and also it becomes essential to use a more robust and thus more expensive filter. This problem is alleviated to a certain degree in the apparatus described in the above-mentioned specification by providing within the filtering passage a supporting backing plate so that cheaper less robust filters can be used, the filter band or ribbon sliding over the backing plate during forwarding, and the backing plate can also be profiled or otherwise designed to present the least possible frictional resistance to passage of the filter band or ribbon thereacross. However despite the provision of a suitably profiled backing plate it is often found when filtering highly contaminated substances where the filter clogs quickly that the frictional drag upon the filter band or ribbon necessitates the use of expensive robust and substantial filters.

In order to overcome or at least substantially reduce the above-mentioned problem it is proposed according to this invention to provide a filtering device including a body defining a passage through which a substance to be filtered can be caused to flow, and slotted inlet and outlet ports flanking the passage through which a filter in the form of a band or ribbon can be passed and moved to introduce different parts of said filter across said passage, said ports being adapted for the formation therein, in use, of sealing plugs a flowable sealing substance of adequate rigidity to permit movement of said filter through said ports without substantial leakage of substance being filtered, the device further including an endless movable backing support mounted within said passage for supporting the filter band or ribbon, the said movable backing support being movable in the direction of filter movement so that the said support acts as a movable bearing for the filter band or ribbon and being apertured or otherwise shaped to limit its resistance to the flow of substance being filtered through the said passage.

Preferably the filter band or ribbon is arranged to approach and leave the supporting surface of the said movable backing support tangentially or substantially tangentially to ensure optimum freedom of movement of the filter. In one preferred arrangement which is fully described hereafter the movable backing support is a rotatable cylindrical drum, the filter passes through inlet and outlet channels to approach and leave the passageway and the surface of the drum mounted therewithin and the channels are disposed tangentially to the drum surface.

In circumstances where the backing support is so constructed that the filter is liable to balloon into slots or apertures formed in the backing support for the passage therethrough of substance being filtered, it may be necessary to make special provision for taking off the filter from the surface of the backing support at the filter exit side of the filtering passageway: in one arrangement where the backing support consists of a number of spaced circular plates centrally mounted upon or formed integrally with and perpendicular to an axle journaled at each end in the wall of the filtering passageway, and a takeoff comb the teeth of which extend between the plates of the backing support is mounted tangentially to the surface of the backing support in a filter exit channel to one side of the filtering passageway.

It will be appreciated that where the backing support is in the form of a rotary backing drum the nature of the bearings in which the rotary backing drum is journaled will depend very much upon the nature of the substance being filtered. Thus for filtering synthetic plastics materials for example it may prove sufficient to use plain bearings (e.g., a shaft of the drum running in bores formed in the wall of the filtering passageway) since any plastics material entrapped in the bearings in use will rapidly degrade and result in a carbon deposit upon the bearing surfaces, i.e., an effective carbon bearing. For filtering corrosive substances it will be necessary to employ either sealed bearings to ensure that no corrosive material leaks into the bearing or to make the bearings of such a material as to be relatively immune from corrosion. In some circumstances it may also be desirable during operation to circulate filtered substance from the "clean" side of the filter band or ribbon through the bearings and into said passage thus preventing the contamination of the bearings by unfiltered substance.

Although the use of an endless movable backing support in the form of a rotatable cylindrical backing drum overcomes or at least substantially reduces the problem encountered with apparatus such as that disclosed in the specification of U.S. Pat. No. 3,471,017 wherein a filter band or ribbon is disposed across a passageway to filter a substance flowing therethrough and provision is made for forwarding the filter band or ribbon to move a fresh part thereof into the filtering passage without the necessity of dismantling the filtering apparatus or interrupting the flow of substance being filtered, that, as the filter becomes progressively clogged with impurities filtered out of the stream of substance, the force upon the part of the filter in the passage due to the hydrostatic pressure of the substance being filtered rises to such an extent that in some cases of heavy contamination it is only with difficulty that the filter can be forwarded and also it becomes essential to use a more robust and thus more expensive filter.

As mentioned above the backing support can, for example, consist of a number of spaced parallel circular plates centrally mounted upon or formed integrally with and perpendicular to an axle journaled at each end in the wall of the filtering passageway: other forms of endless moving backing support are also suitable. In particular it has been found that rather than using a backing drum which is formed with or connected to an axle for rotation therewith, a more easily movable arrangement is obtained using an endless train of rollers as rotary bearings for the filter band or ribbon either with or without the intermediacy of a perforated backing band or cylinder between the rollers and the filter, the rollers being spaced apart or, if contacting one another, being appropriately shaped to permit passage of the substance being filtered therebetween and being constrained to roll around a predetermined path around part of which they serve as a backing support for a filter band or ribbon entrained across the filtering passage.

In one such arrangement the rollers roll upon and around a core member in the filtering passage, such core member being apertured or otherwise shaped to limit its resistance to the flow through the filtering passage of the substance being filtered. In another arrangement no central core is required since each end of each of the rollers is located in a grooved track, and the rollers roll with both their ends supported in the tracks.

Although the first-mentioned form of backing support, i.e., a rotary cylindrical drum, provides a substantial improvement in the ease of forwarding of the filter by virtue of the mechanical advantage inherent in the use of a rotary drum as backing support, and yet a further improvement is obtained by the second-mentioned form of backing support, i.e., a support in the form of an endless train of rollers, nevertheless, owing to the very considerable differential in the hydrostatic pressure encountered in the filtering of some substances, it is found that, especially where the substance being filtered is heavily contaminated, the forces acting upon the backing support can still rise to such a level that it is only with difficulty that the backing support can be put into movement merely by pulling on the filter. Although it is possible to apply a mechanical drive to the backing support, this solution to the problem is not attractive for commercial reasons in view of the necessity of providing high-pressure seals for sealing the passage through the body of the filtering device of drive shafts or the like. Consequently, despite the advances obtained by the two above-mentioned inventions, in some circumstances it is still found to be necessary to use a very robust and consequently expensive filter.

To alleviate further the above-mentioned problem it can be arranged that the endless moving backing support, e.g., a rotary backing drum or an endless train or rollers supports the filter band or ribbon across the filtering passage and moves out of the filtering passageway through a slotted outlet port adapted for the formation therein of a sealing plug of the material being filtered or of another suitable material either with the filter band or ribbon or after separation therefrom in which case the filter leaves the filtering passage via another such slotted outlet port, the said backing support then reentering the filtering passageway after separation from the filter via a slotted reentry port likewise adapted for the formation therein of a sealing plug.

By virtue of such an arrangement a two-fold improvement can be obtained. Firstly, by bringing the backing support out of the filtering passageway it is made accessible to be driven mechanically. Secondly, by making the outlet port cross section greater than that of the inlet port so that the drive for forwarding the filter is derived from the hydrostatic pressure of the substance being filtered (as explained in U.S. Pat. No. 3,471,017 it can be arranged that not only is the sealing plug in the outlet port extruded by the hydrostatic pressure but also the backing support is extruded with the sealing plug so that a positive drive is applied directly to the backing support.

As compared with the first and second arrangements previously mentioned herein where the backing support is a rotary drum or train of rollers and the filter effectively acts as a drive belt for moving the backing support, the backing support moving only when the force translated through tension in the filter to the backing support becomes greater than the frictional resistance to movement of the backing support, the third arrangement proposed above enables the backing support to be driven directly, either mechanically or hydrostatically, and requires no pull to be exerted on the filter itself. Thus a lighter gauge and less robust filter can be used which is considerably less expensive.

Although it can be arranged that the backing support and the filter band or ribbon move out of the filtering passage through separate outlet ports, it is more convenient to arrange that they move together out of the same outlet port in which case the sealing plug in the outlet port effectively connects the filter to the backing support since the material of the sealing plug permeates into both the interstices of the filter and the apertures provided in the backing support for the passage therethrough of substance being filtered.

Described fully in detail hereafter are filtering devices operable in accordance with this invention which have a body within which is formed a filtering passage, through which a substance to be filtered can be caused to flow, and slotted inlet and outlet ports flanking the filtering passage, which permit a filter in the form of a continuous band or ribbon to be introduced across the passage and moved to expose fresh parts of the filter to the passage as the filter becomes contaminated in use. An endless movable backing support, e.g., in the form of a rotary backing drum or of an endless roller chain, is arranged for supporting the filter band or ribbon within the filtering passage and, in some of the embodiments described hereafter, passes with the filter, through the filter outlet port and then reenters the filtering passage through a reentry port. In accordance with the teaching of U.S. Pat. No. 3,471,017 the filter inlet port, the filter outlet port and, where the backing support moves out of the filtering passage, the backing support outlet and reentry ports are all adapted for the formation therein, in use, of sealing plugs of the substance being filtered or of another suitable substance and permit movement of the respective parts through the respective ports without substantial leakage of the substance being filtered under conditions providing for self-maintenance of the sealing plugs; also the filter outlet port, (and where appropriate the backing support outlet port) is of substantially greater cross-sectional area than the filter inlet port (and where appropriate the backing support reentry port) so that, in use, the drive for forwarding the filter is derived from or at least assisted by the hydrostatic pressure of the substance being filtered. Since, in use of the devices where the backing support moves out of the filtering passageway, the sealing plug in the outlet port is effectively connected to the backing support, and to the filter band or ribbon, by virtue of the permeation of the substance being filtered through the interstices of the filter and the apertures (or whatever) in the backing support for enabling the flow of substance therethrough a positive drive is applied directly to the backing support with extrusion of the sealing plug (and consequently of the backing support) and the filter band or ribbon thus is forwarded without having to be put under any direct tension. As a result, a less robust and considerably less expensive filter can be used.

In order that this invention might be understood more clearly a number of preferred forms of filtering device and a process in accordance therewith will now be described by way of example only with reference to the accompanying drawings wherein:

FIG. 2 is a sectional plan view taken on the line II—II of FIG. 1;

FIGS. 3A and 3B are alternative sectional views showing a detail of the device of FIG. 1 and 2;

FIG. 4 is a cross-sectional side elevational view of a modified form of the filtering device according to this invention shown in FIG. 1 disposed in its normal operative position to filter a vertically rising stream of substance, the parts of the device for sealing the filter inlet and exit ports being omitted from this view but being as shown in FIG. 1;

FIG. 5 is a sectional plan view taken on the line V—V of FIG. 4;

Figure 11A:
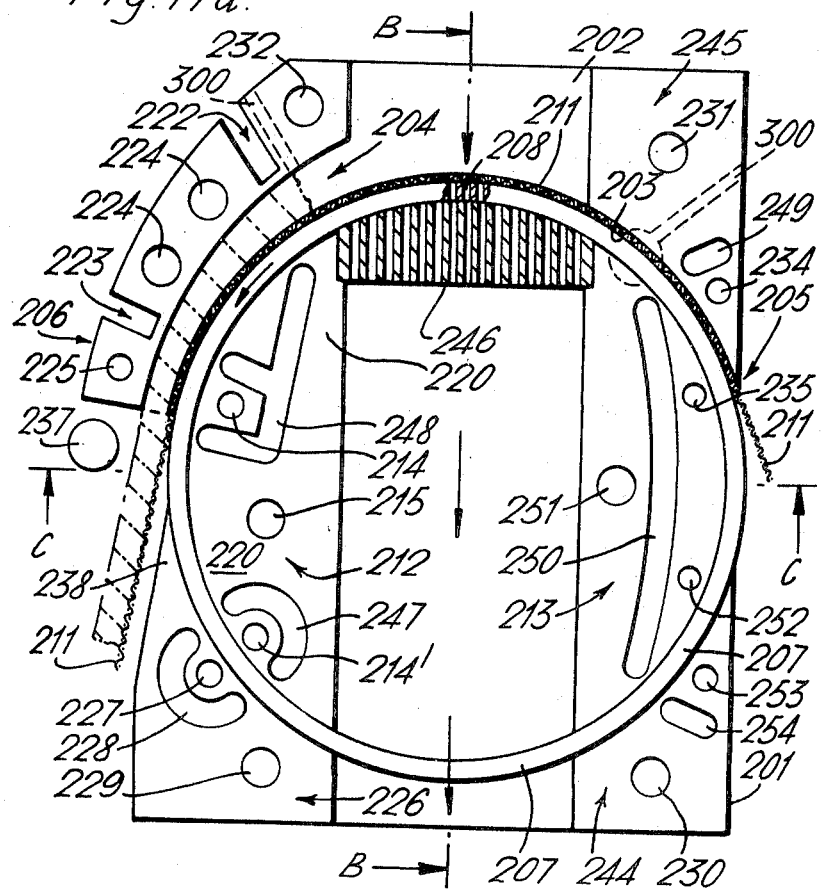
Figure 11C:
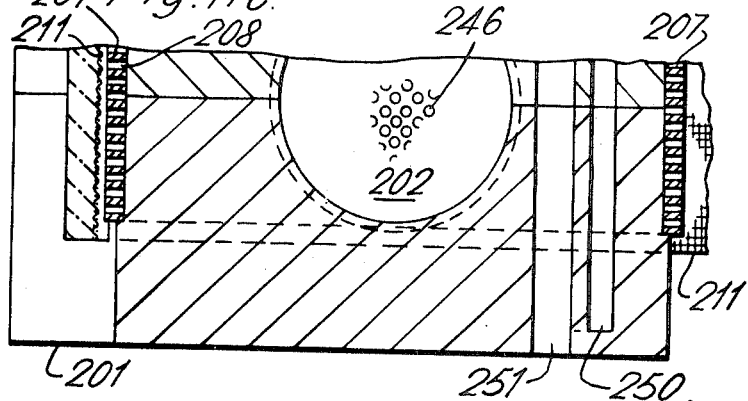
Figure 12:
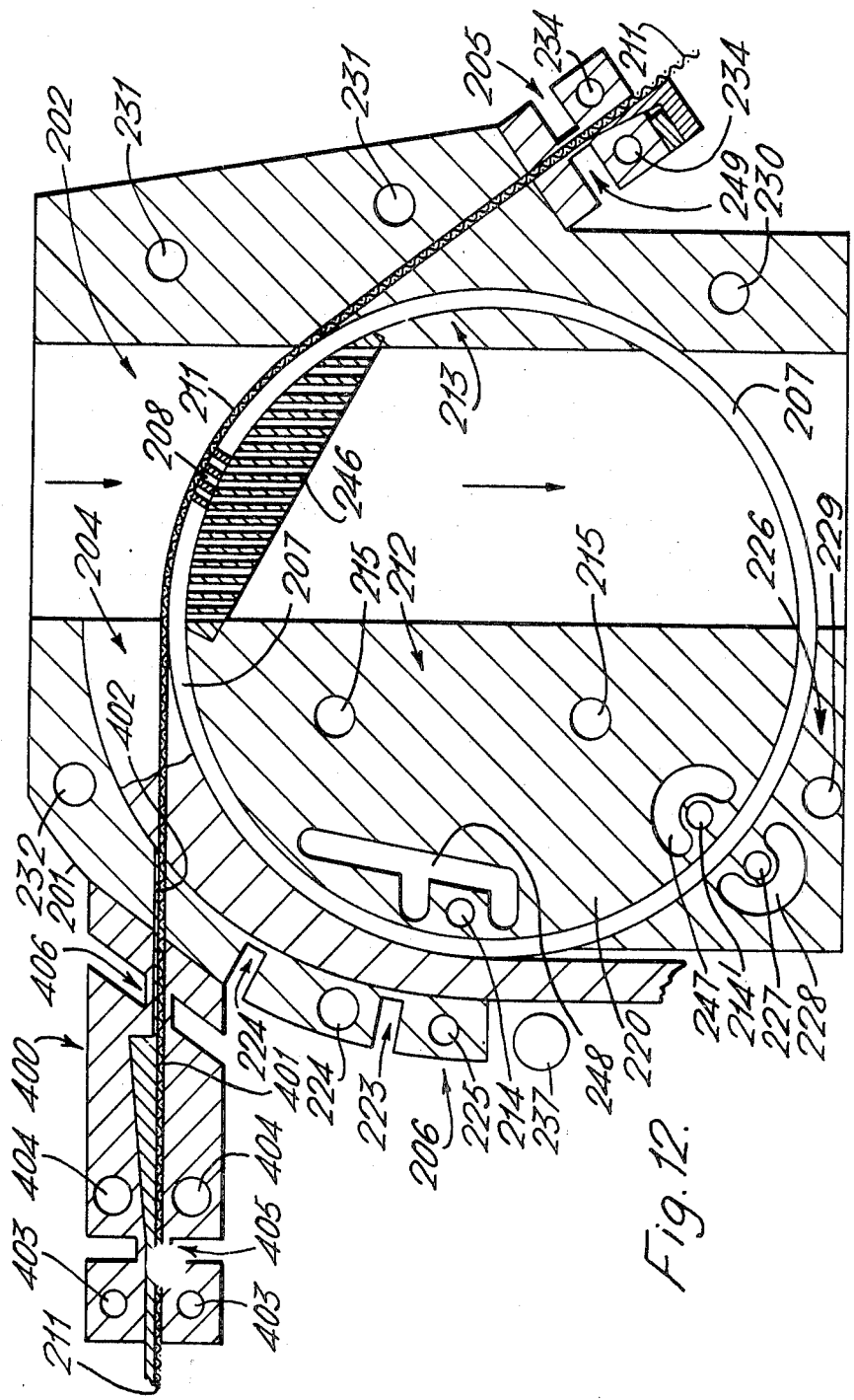
Figure 13:
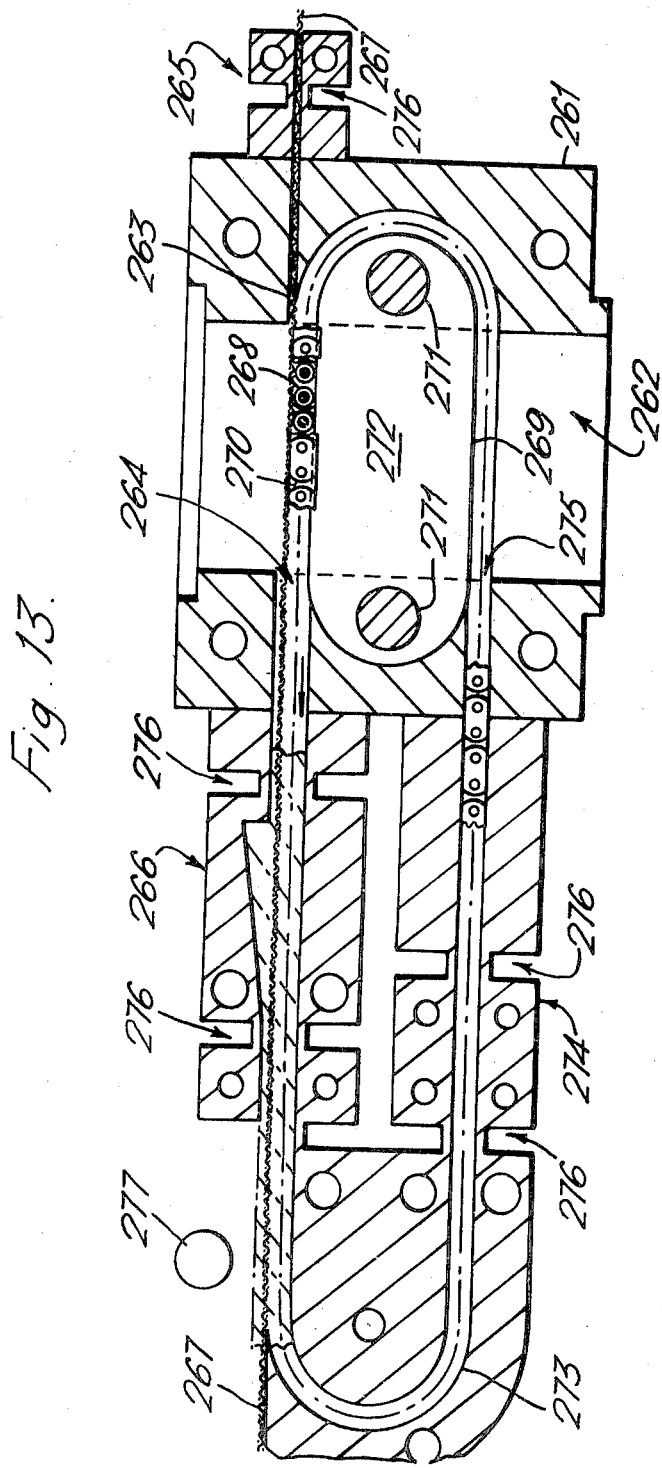
Figure 14:
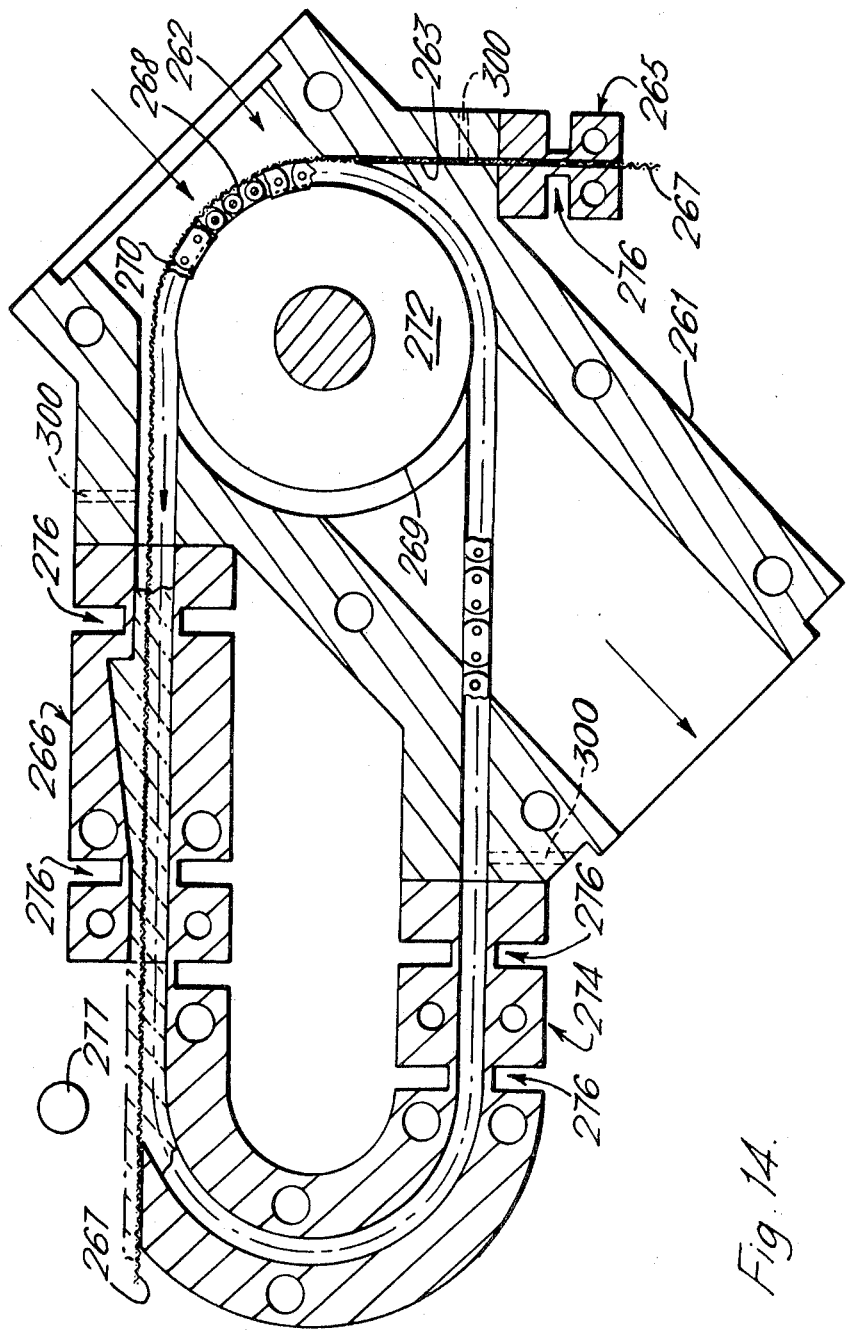

FIGS. 9A, 9B and 9C respectively show a sectional plan view of a fourth form of filtering device which employs a backing support in the form of a perforated cylindrical drum, a sectional fragmentary view taken on the line B—B of FIG. 9A, and a sectional fragmentary view taken on the line C—C of FIG. 9A;

FIG. 10 shows a modification of the device of FIGS. 9A, 9B and 9C for improving the seal at the backing support reentry port;

FIGS. 11A, 11B and 11C respectively show a sectional plan view of a fifth form of filtering device and sectional fragmentary views taken on the lines B—B and C—C of FIG. 11A;

FIG. 12 shows a device similar in many respects to that of FIGS. 11A to 11C but with the filter leaving the body of the device via a separate exit port after separation from the backing support within the body of the device;

FIG. 13 is a sectional plan view of another form of filtering device which employs a roller chain as backing support for the filter; and FIG. 14 is a sectional plan view of another form of filtering device which employs both a roller chain and a rotary backing drum as backing support for the filter.

Figure 1:
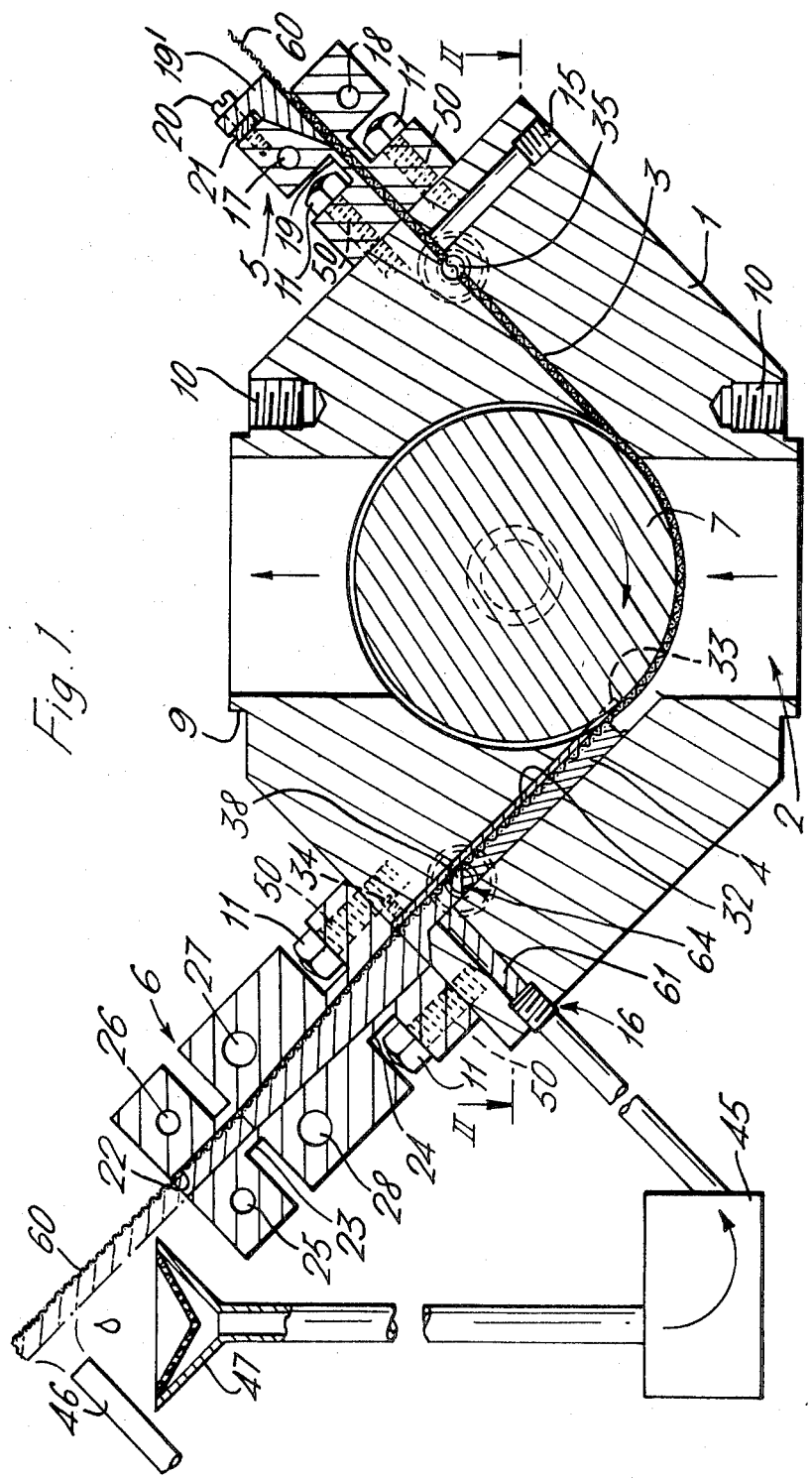
FIG. 1 is a sectional side elevational view of a filtering device according to this invention disposed in its normal operative position to filter a vertical rising stream of substance.

As shown in FIG. 1 the filtering device consists of a body 1 having formed therethrough a passage 2 through which a substance to be filtered can be caused to flow and having slotted inlet and outlet channels 3 and 4 respectively which communicate with slotted inlet and outlet ports 5 and 6 respectively. A rotary backing drum 7 is mounted in the filtering passage 2 to serve as a backing support for a filter band or ribbon 60 (formed for example of Dutch weave stainless steel wire cloth) introduced into the filtering passage 2 via inlet port 5 and passing out of passage 2 via outlet port 6. The inlet and outlet channels 3 and 4 and the communicating slots in the inlet and outlet ports 5 and 6 are arranged tangentially with respect to the circumferential surface of drum 7. The direction of substance flow during filtering is indicated by the arrows drawn in the passage 2, and the direction of rotation of drum 7 with forwarding of the filter 60 is also indicated.

The body 1 is formed with flanges at 8 and 9 and with threaded boltholes one of which is shown at 10 for connection of the filtering device into a supply line of the substance to be filtered. The inlet and outlet ports 5 and 6 respectively are each attached to the body 1 by means of threaded studs 50 secured by nuts 11 which sit in slots in their respective inlet and outlet port and engage with threaded boltholes in the body 1. As shown most clearly in FIG. 2 the rotary filter backing drum 7 is journaled in side flanges 12 and 13 which close a second passage formed through body 1 at right angles to passage 2, the side flanges 12 and 13 being secured by means of bolts 14 only one of which is shown.

Bores 15 and 16 are formed in the body 1 for the admission of suitable plug-forming substance 61 into the channels 3 and 4 of the inlet port 5 and outlet port 6 respectively, the bores 15 and 16 communicating with the channels 3 and 4 at points in the channels 3 and 4 which are spaced away from the filtering passage 2 as shown in FIG. 1. The ends of the bores 15 and 16 remote from the channels 3 and 4 are internally screw threaded for receiving couplings for attaching conduits for supplying plug-forming substance 61 thereto.

In the illustrated and described filtering device the driving force required for advancing the filter band or ribbon 60 is arranged to be provided by hydrostatic pressure although other additional mechanical filter driving means could be provided. For this purpose the inlet port channel 3 is narrower than the outlet port channel 4 so that, in use, with a sealing plug formed in each channel the force acting upon the sealing plug in the outlet channel 4 due to the hydrostatic pressure of the substance being filtered is greater than the force acting upon the sealing plug in the inlet channel 3 and since the sealing plugs adhere to the filter band or ribbon 60 a resultant force acts upon the filter band or ribbon 60 in the direction such as to cause its advance. As considered previously herein the movement of the filter band or ribbon 60 can be controlled simply by controlling the temperature conditions at the inlet and outlet ports. As will be appreciated the temperatures necessary at the inlet and outlet ports will be dependent upon the nature of the substance being filtered and of the sealing substance and in some cases it might be necessary to heat the ports 5 and 6 above ambient and in other cases cool them below ambient.

As with the apparatus disclosed in the specification of U.S. Pat. No. 3,471,017 the apparatus according to this invention is well suited to continuous rather than intermittent advance of the filter band or ribbon. For achieving intermittent filter advance it is necessary periodically to alter the conditions at one or both of the sealing ports, whereas for continuous filter advance stable or substantially stable conditions can remain at the sealing ports. A number of different sealing ports are disclosed in the above mentioned specification, each having certain characteristic features, and these sealing ports can be used with this invention. As illustrated in FIG. 1 of the accompanying drawings the inlet 5 has channels 17 and 18 for coolant or heating media and has a narrow waisted portion 19 which serves to minimize heat flow between the body 1 and the part of the inlet port 5 which is cooled when coolant flows in channels 17 and 18. The slot of the inlet port 5 is only wide enough to ensure that enough material leaks around or beside the filter ribbon to provide an adequate pressure seal, and is parallel-walled so that the inlet sealing plug formed in use offers little resistance (its temperature being controlled) to forward movement of the filter. The width or the inlet port slot is adjustable by virtue of the adjustment wedge 19' which is attached to the inlet port 5 by means of screws 20 and is adjustable by adjusting the thickness of a spacer 21. The outlet port 6 has a slot which narrows in the direction of movement of the filter band or ribbon; this enables the filter movement to be controlled by controlling the temperature of the plugs since the plug must change its shape to squeeze through the tapering slot and the rate of deformation of the plug is dependent, inter alia, upon its temperature. The outlet port 6 slot also has an additional, substantially parallel-walled outer sealing zone 22 which, in use of the device, is permanently maintained at a temperature lower than that of the remainder of the sealing port so that this zone 22 contains more rigid material which acts as a sliding plug and assists in preventing the leakage of less rigid material. A narrow waisted portion 23 of outlet port 6 serves to minimize heat flow between the tapered and the parallel-walled sections of the outlet port which are maintained at different temperatures, and a narrow waisted portion 24 serves to minimize heat flow between the body 1 and the tapered section of the outlet port 6. Channels 25, 26, 27 and 28 are provided in the outlet port for coolant or heating media, although any other means for maintaining the different sections of outlet port 6 at their desired temperatures may be employed. For ensuring that the thermal inertia of the inlet and outlet ports 5 and 6 is small they may be formed from a material, such as Beryllium Copper for example, having a high thermal conductivity. For further minimizing heat transfer between the body 1 and the inlet and outlet ports 5 and 6 it may be desirable to introduce heat insulating gaskets, e.g., of asbestos composition, therebetween.

FIG. 2 shows most clearly the form of the backing drum 7 for supporting the filter band or ribbon 60 against the hydrostatic pressure developed in the substances being filtered. The backing drum 7 consists of seven circular plates 30, e.g., of stainless steel, formed integrally with an axle 31 which, as previously mentioned, is journaled in side flanges 12 and 13. The bearings by which axle 31 is journaled in side flanges 12 and 13 may be of any convenient form; it has been found that for filtering plastics it is quite adequate to use plain bearings since any plastics leaking into the bearings rapidly degrades and a carbon bearing results. In some circumstances it may be convenient to provide a small bore in the body 1 leading from the clean side of the filtering passage 2 to the bearings and arrange a flow of clean filtered substance through the bearings to keep them clean and to serve as lubricant.

A takeoff comb 32 is provided the teeth 33 of which project a short distance between the backing drum plates 30 as shown in FIGS. 1 and 2. The comb 32 is fixed in outlet channel 4 by means of countersunk screws 34. The purpose of the takeoff comb 32 is to facilitate movement of the filter band or ribbon 60 off the backing drum 7 and into channel 4.

The illustrated embodiment by the provision of bores 15,16 is designed for carrying out the process according to the invention which involves the introduction of a sealing substance different from but compatible with the substance to be filtered. In use the sealing substance 61 is introduced via bores 15 and 16 into the inlet and outlet ports 5 and 6 respectively. It many be arranged that sealing substance 61 is introduced intermittently as desired or it may be arranged to introduce the sealing substance 61 continuously at a controlled rate. In either case it is desirable that the introduction of sealing substance 61 be achieved automatically. For this purpose it is proposed to provide in the channels 3 and 4 some means of detecting whether, at a particular point in the channel, there is present sealing substance 61 or the substance being filtered. Various such means will be apparent and two will now be described with particular reference to FIGS. 3A and 3B of the accompanying drawings.

FIG. 3A shows a part sectional view to an enlarged scale of a portion of the inlet channel 3 slightly nearer to filtering passage 2 than bore 15 is, the section being taken in the plane containing the greater dimension of the channel cross section. In the arrangement of FIG. 3A the detection of whether sealing substance 61 or substance being filtered is present is carried out optically using visible light; alternatively ultraviolet or infrared radiation may be used. A bore 35 is formed through body 1 so as to intersect channel 3 and at each end of bore 35 a radiation transmitting window is provided, the window being constituted, in the case of visible light, by a conical glass plug 36 cemented into a housing 37 secured in the bore 35. A line of sight now exists through channel 3 and the presence of sealing substance 61 or filtering substance can be detected, for example, optoelectronically using a light source 62 at one end of the bore 35 and a phototransducer 63, e.g., photocell or photoconductor, circuit at the other as shown diagrammatically in FIG. 2, as is well known. A similar arrangement is provided in a bore 38 in the body 1 intersecting the outlet channel 4. It will be appreciated that the detecting means shown in FIG. 3A can only be effective if the radiation absorbing properties of the sealing substance(s) 61 and of the filtered substance are different. In cases where the difference in such properties is small, radiation absorbing matter, e.g., dye in the case of visible radiation, can be introduced into the sealing substances(s) 61 to increase such differences.

FIG. 3B illustrates an alternative arrangement utilizing an electric detector which, for example, might be responsive to differences in the electrical conductivities or dielectric constants of the sealing substance 61 and the substance being filtered. This arrangement is similar to that of FIG. 3A except that the housing 37 has set therein an insulating dielectric 51 carrying electrodes 40 and 41 which extend into channel 3. As is well known a change of substance in the region of channel 3 containing electrodes 40 and 41 can be detected as a conductivity change or a change in dielectric constant for example and to facilitate this the sealing substance 41 would be chosen to have a different electrical conductivity or dielectric constant from the substance being filtered. A like arrangement can be provided in the bore 38 in body 1 intersecting the outlet channel 4.

In operation of the illustrated filtering device to filter contaminated brine, for example, a convenient sealing substance 61 is paraffin wax. The brine is pumped into the filtering passage 2 and molten wax is pumped by means of pump 45 via bores 15 and 16 into inlet and outlet channels 3 and 4, the pressures of brine and wax being such as to form a brine/wax interface 64 in channels 3 and 4. The temperature of the inlet and outlet ports 5 and 6 are maintained at such a level that the wax hardens therein so that sealing plugs are formed.

For intermittent movement of the filter band or ribbon 60 it is necessary only to cause the wax sealing plugs in the inlet and outlet ports 5 and 6 to soften sufficiently to enable the sealing plug in the outlet port 6 to be extruded therefrom by the hydrostatic pressure of the substance to be filtered in passage 2. If desired a pressure sensor can be disposed in the filtering passage 2 upstream of the filter to sense when the filter 60 is becoming clogged and should be forwarded and automatic means responsive to the pressure sensor provided for causing forwarding of the filter band or ribbon 60. Alternatively an automatic timer could be arranged to control the filter movement.

For continuous forwarding movement of the filter band or ribbon 60 conditions appropriate to the nature of the sealing substance are established in the inlet and outlet ports as discussed fully hereinbefore.

As discussed hereinbefore the sealing substance 61 (e.g., wax) may be introduced intermittently under the control of the described detecting means provided in boreholes 35 and 38, or may be introduced continuously at a controlled rate. Clearly if the filter band or ribbon 60 is moved intermittently it will be necessary to introduce further sealing substance 61 only intermittently and if the filter band or ribbon 60 is moved continuously the sealing substance 61 may be introduced continuously or may be introduced intermittently as the need arises.

The sealing plug is extruded from the outlet port 6 in operation of the apparatus together with the filter band or ribbon 60 and contaminating material entrapped therewith. In FIG. 1 there is illustrated schematically an arrangement whereby the sealing substance 61 (e.g., wax) is recovered from the extruded plug by heating (reference numeral 46), collecting the molten sealing material in a filtering funnel 47 and returning it to pump 45 for recirculation.

It may furthermore be arranged that the filter band or ribbon 60 is recovered after passing through the outlet port 6 and then recirculated back to the inlet port 5 for further use. This can be achieved by extracting the sealing substance 61 and contaminant from the filter 60 by heating and/or solvent extraction. It can also be arranged that the filter band or ribbon 61 is formed of two parts, viz. a first part which collects the impurities and can be discarded and a second backing part which can be recirculated.

In the preceding description the temperatures of the inlet and outlet ports 5 and 6 have been controlled by means of coolant or heating fluid flow in channels 17, 18, 25, 26, 27 and 28; it will be understood that, depending upon the nature of the substance being filtered and upon the nature of the substance or substances 61 forming the sealing plugs it may be appropriate to heat the inlet port 5 while cooling the outlet port 6, or vice versa, or to heat or cool both the inlet and the outlet ports 5 and 6. The ports 5 and 6 may be heated by passing a suitable heat-transfer medium, such as heated Silicone oil through the channels formed therein.

It will be appreciated by those skilled in the art that the example given merely illustrates one way in which the process according to the invention may be applied; the essential feature of the process being that the filter is provided in the form of an extended ribbon which passes through a filtering enclosure sealed by partially or fully solidified end plugs at least one of which is formed of a substance other than that which is being filtered. Replacement of the clogged filter areas and removal of the impurities from the stream of the material being filtered is achieved by movement of the filter ribbon. This may most simply be brought about by utilizing the hydrostatic pressure present but may also be caused, enhanced or retarded by direct mechanical pull at either end of the ribbon. It will be readily seen that the scope of the invention embraces the filtering of all substances in the substantially fluid state so long as a compatible sealing substance can be found which is capable of sufficient thermal solidification to effect a satisfactory seal. It will be clear also that the cross section of the filter band or ribbon need not be of a flat rectangular shape but may be wavy or channel shaped or of any other configuration as best suited to the individual filtering application. It will also be appreciated that the rotary backing support shown in FIGS. 1 and 2 is not only suitable for devices wherein the sealing plugs are formed of a different material from that being filtered but is also suitable for use in devices wherein the sealing plugs are formed of the substance being filtered: such devices are disclosed in U.S. Pat. No. 3,471,017.

Referring now to FIGS. 4 and 5 the filtering device shown therein consists of a body 101 having formed therethrough a passage 102 through which a substance to be filtered can be caused to flow and having slotted inlet and outlet channels 103 and 104 which will communicate with slotted inlet and outlet sealing ports respectively such as ports 5, 6 shown in FIG. 1. A continuous filter band or ribbon 105, formed for example of Dutch weave stainless steel wire cloth, is shown in situ extending through the inlet channel 103, across the filtering passage 102 and out through the outlet channel 104.

A rotary backing support is provided for supporting the filter band or ribbon 105, such backing support consisting of a perforated stainless steel cylinder 106 supported by means of rollers 107 to be rotatable about a central core 108. The rollers 107 are held apart from one another by virtue of their each being journaled at both ends in a metal cage ring 109, so that the substance being filtered can pass freely between the rollers 107 after passing first through the filter band or ribbon 105, and then the perforated cylinder 106. As shown clearly in FIG. 5 the core 108 consists of a stem 110 having formed integrally therewith circular vanes 111 upon the circumferences of which the rollers 107 are supported, the core 108 being formed integrally with a detachable part 112 of the body 101 for ease of assembly and for easy access for routine maintenance; by so shaping the core 108 it is ensured that the core 108 presents little resistance to the flow of substance being filtered.

In use of the filtering device shown in FIGS. 4 and 5 the substance being filtered flows in the direction indicated by the arrows in FIG. 4, the filter band or ribbon 105 is advanced from right to left, and the filter backing support rotates in a clockwise direction.

Figure 6:
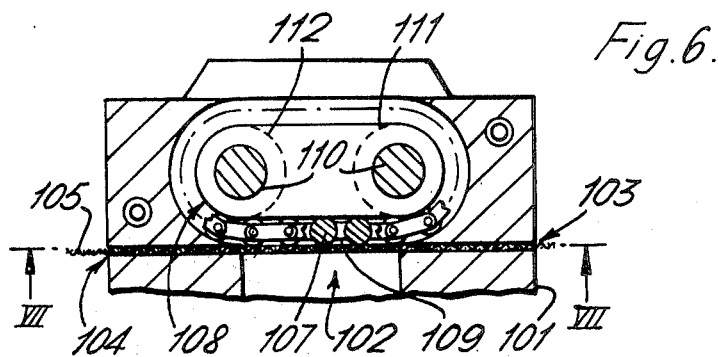
FIG. 6 is a cross-sectional side elevational fragmentary view of a third filtering device according to this invention, the parts of the device for sealing the filter inlet and exit ports again being omitted but being as shown in FIG. 1.
Figure 7:
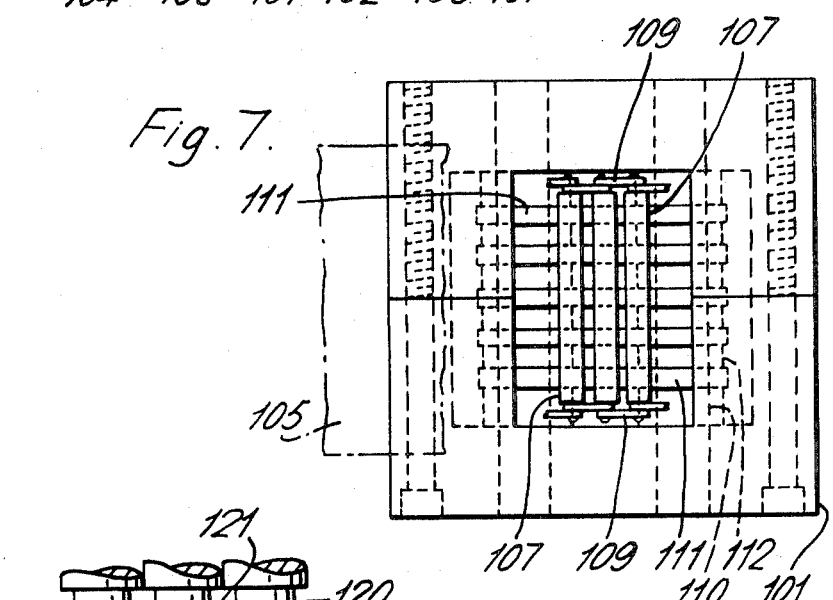
FIG. 7 is a sectional view taken as the line VII—VII of FIG. 6.

The device of FIGS. 6 and 7 differs from that of FIGS. 4 and 5 principally in that it is not a rotary arrangement and that no intermediate support (such as the perforated cylinder 106 in the device of FIGS. 4 and 5) is provided between the filter band or ribbon 105 and the support rollers 107. The device of FIGS. 6 and 7 thus includes a body 101 formed with a filtering passage 102 and having slotted inlet and outlet channels 103 and 104 respectively for the filter band or ribbon 105. Although not shown in FIGS. 6 and 7 slotted inlet and outlet ports such as ports 5 and 6 of the FIG. 1 embodiment are provided.

For supporting the filter band or ribbon 105 across the passageway there is provided an endless movable backing support consisting of a roller chain consisting of an endless train of rollers 107 which roll upon and around a central core 108, the rollers 107 being interconnected by links 109 which hold them apart to permit the substance being filtered to pass therebetween. The core 108 consists of two vertical (as shown in FIG. 7) rods 110 supporting therebetween a number of horizontal plates 111, upon the circumferential periphery of which the rollers 107 bear, and spacers 112.

Since, in the device of FIG. 6 and 7, no intermediate support is provided between the rollers 107 and the filter band or ribbon 105, it is necessary to have the rollers 107 of smaller diameter than those shown in the device of FIGS. 4 and 5 and to have them closer together so that the rollers 107 themselves constitute an endless moving backing support and thus perform the function of the supporting cylinder 106 of the FIGS. 4 and 5 device.

Figure 8A:
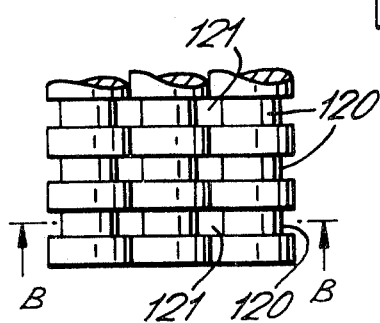
FIGS. 8A and 8B illustrate an alternative form of roller bearings to those shown in FIGS. 6 and 7, the roller bearings of FIGS. 8A and 8B being shaped to provide apertures between contiguous rollers, FIG. 8B being a sectional view on the line B—B of FIG. 8A.
Figure 8B:
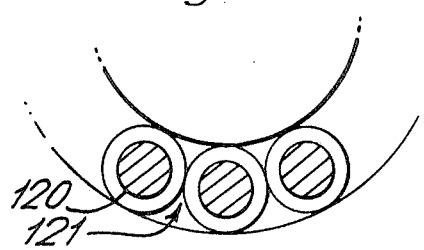

FIGS. 8A and 8B show a roller configuration wherein the rollers each have waisted portions 120 which in contiguous rollers, cooperate to form apertures 121 through which the substance being filtered can flow. Thus, if such rollers are used, it is not necessary to ensure that adjacent rollers do not touch one another. The rollers of FIGS. 8A and 8B could be substituted for the rollers 107 of the devices of FIGS. 4 to 7 providing the vanes 111 of the FIGS. 4 and 5 device or the plates 111 in the FIGS. 6 and 7 device are spaced apart an appropriate distance to bear at their edges upon the greater diameter portions of the rollers. Alternatively the rollers of FIGS. 8A and 8B could be used in an arrangement wherein no central core was provided but, for supporting and guiding the rollers in their movement, the ends of the rollers were received in grooved tracks, around which the rollers were adapted to roll.

It will be appreciated that the backing supports shown in FIGS. 4 to 8B could be used in devices such as that of FIGS. 1 and 2 which operate in accordance with the improved process according to this invention with sealing plugs formed of a different substance than that being filtered, as well as in devices where the sealing substance is the substance being filtered.

Referring now to FIGS. 9A, 9B and 9C there is shown therein a filtering device consisting of a body 201 formed in two halves which are clamped or welded together (see FIG. 9C) having formed therethrough a passage 202 through which a substance to be filtered can be caused to flow in the direction of the arrows. The body 201 is also formed with slotted inlet and outlet channels 203 and 204 respectively which communicate with inlet port 205 and integrally formed outlet port 206.

An endless movable backing support in the form of a hollow cylindrical stainless steel drum 207 with a multiplicity of perforations 208 through its curved surface is mounted eccentrically of the filtering passageway 202, the drum 207 being supported by means of a web 209 secured to or integral with an axle 210 journaled at each end in the body 201 as shown in FIGS. 9B and 9C. As described fully hereinbefore the bearings by which axle 210 is journaled in the body 201 may be of any convenient form; for filtering plastics it has been found adequate to use plain bearing since any plastics leaking into the bearings rapidly degrades and a carbon bearing results, and in some circumstances it may be convenient to arrange for a flow of clean filtered substance through the bearings to keep them clean and to serve as lubricant.

As shown most clearly in FIG. 9A a continuous filter ribbon 211, formed for example of Dutch weave stainless steel wire cloth, is shown in situ extending through the inlet port 205 and inlet channel 203 into the filtering passage 202. Within the passage 202 the filter ribbon 211 is supported upon the surface of the backing drum 207, and the filter ribbon 211 leaves the filtering passage 202 via outlet channel 204 and integrally formed outlet port 206.

By virtue of the eccentric positioning of the backing drum 207 relative to the filtering passage 202 and the dimensioning of the drum 207 and passage 202, the backing drum 207 and passage 202 define therebetween two body portions 212 and 213 which are, as shown in FIG. 9A, segmental in cross section. Body portion 212 is formed with channels 214 and 214' for coolant flow and has a heating element 215 embedded therein. It is to be noted that in the drawings the channels designated by the smaller diameter circles, such as channels 214 and 214', are for the circulation of coolant whereas the larger diameter circles represent heating elements, such as heating element 215. Body portion 212 is also formed with channeled cutouts 216 and 217 which are shaped as shown in FIG. 9A to provide a degree of thermal isolation between regions 218, 219 and 220 of body portion 212. Since, as mentioned previously, the body 201 of the device is formed in two halves and the body portion 212 of each half is separated from the body portion 212 of the other half in the assembled condition of the device by the web 209 which supports the backing drum 207 upon its axle 210, it is necessary that the various channels 214, 214', 215, 216 and 217 in the body portion 212 are formed as blind apertures which do not penetrate the full thickness of body portion 212 (see channelled cutout 217 in FIG. 9C), and to ensure proper circulation of coolant in the channels 214 and 214' feed pipes 221 are disposed coaxially therein so as to deliver the coolant to the blind end of the channels from whence it flows out of the channels between the channel wall and the coaxial feedpipe 221.

For constituting the integrally formed outlet port 206 the body 201 is slotted at 222 and 223, has embedded therein a heating element 224 and has formed therethrough (completely in this case since the web 209 provides no obstacle at this position) a coolant channel 225. The element 224 and channel 225, in operation of the device, cooperate with the region of the body portion 212 across the outlet channel 204 therefrom, and in particular with the coolant channel 214, to establish the conditions necessary for the formation of a sealing plug in the outlet channel 204.

The reentry port for the backing drum 207 is constituted in this embodiment by the curved channel defined in body 201 between body portion 212 and body portion 226. For establishing the conditions necessary for the formation of a sealing plug in this reentry port, the body portion 226 is formed with a coolant channel 227 and a semicircular thermally isolating channeled cutout 228 which cooperates with the coolant channel 214' across the reentry port therefrom. As can be seen from FIG. 9A the curved channel defined in body 201 between body portions 212 and 226 and constituting the reentry port becomes progressively wider towards the filtering passage 202; the purpose of this form of construction is to ensure that in use the sealing plug formed in the reentry port causes as little resistance as possible to rotation of the backing drum 207, the rotation of the backing drum 207 tending to loosen the sealing plug in the port.

The mass of the body 1 is heated by suitably positioned heater elements 229 to 232 so that only certain regions of the device which are adjacent to and in thermal communication with coolant channels are not hot in use of the device. By virtue of the slots 222 and 223 and the channeled cutouts 216, 217 and 228 it is ensured that these "cold" regions of the device are fairly well defined.

As discussed at length previously herein and in U.S. Pat. No. 3,471,017 the filter inlet port 205 can have a variety of configurations. The simple configuration shown has a narrow waisted portion 233 which provides thermal isolation between the outer half of the port 205 and the inner half which is secured to the body 201 of the device, and is formed with channels 234 and 235 for the circulation of coolant. A spring-loaded wedge 236 ensures that the filter ribbon 211 makes a sufficiently close fit with the inlet of the port 205 to make good thermal contact therewith and thereby enable an efficient seal to be made in the inlet port 205.

In use of the device illustrated in FIGS. 9A, 9B and 9C, for filtering a heat-softenable plastic for example, the heat-softened plastics is introduced under pressure into the filtering passage 202. The body 201 of the device is maintained for the most part at a suitably elevated temperature so as to preclude the solidification of plastics in the filtering passage 202, and coolant is circulated through channels 234 and 235 in the inlet port 205, through channels 214 and 225 in the outlet port 206 and through channels 214' and 227 in the reentry port so as to establish conditions therein resulting in the solidification of plastics in the ports to form sealing plugs. In the illustrated embodiment forwarding movement of the filter band or ribbon 211 is achieved by extrusion of the sealing plug formed in out port 206 under the action of the hydrostatic pressure of the heat-softened plastics being filtered; it is to be noted that the cross-sectional area of the outlet channel 204 is considerably greater than that of the inlet channel 203 so that there is a differential between the force exerted upon the sealing plug in the outlet port and the opposing forces exerted upon the sealing plug in the inlet port 205 by the hydrostatic pressure of the substance being filtered upstream of the filter and upon the sealing plug in the reentry port by the lower pressure of filtered substance downstream of the filter. For a complete discussion of the control of forwarding movement of the filter reference may be made to the specification of U.S. Pat. No. 3,471,017 for the purposes of this specification it is sufficient to note that temperature conditions can be established in the inlet, outlet and reentry ports such that the filter 211 will be forwarded continuously by the action of the hydrostatic pressure of the substances being filtered on the sealing plug in the outlet port 206, such conditions furthermore providing for self-maintenance of the sealing plugs.

There is thus formed a sealing plug in the outlet port 206 at a region thereof extending between the coolant channels 225 and 214 which effectively connects the filter ribbon 211 to the backing drum 207, the solidified plastics forming the sealing plug being distributed through the weave of the filter ribbon 211 and into the apertures 208 in the surface of the backing drum 207. A positive forwarding drive is thus applied through the sealing plug to both the filter ribbon 211 and the backing drum 207 solidly embedded in the plug so that no undue tensions or other stresses are required to be set up in the filter ribbon 211 in order to forward it. Instead a positive drive is applied to the backing drum 207 to extrude part of the periphery of the drum 207 with the sealing plug. The filter ribbon is carried with the drum 207 effectively connected thereto by the sealing plug.

To delaminate the filter ribbon 211 from the backing drum 207 to which it is effectively connected by the sealing plug as it is extruded from the outlet port 206, it is necessary to reheat the plastics forming the plug. This reheating is achieved by means of a radiant heat source 237 and by means of the hot edge 238 of the body portion 226 which is heated by heating element 229 and the region 218 of body portion 212 which also is hot. The delamination of the filter ribbon 211 and backing drum 207 in this manner does not affect the sealing plug which is formed between coolant channels 214' and 227 in the backing drum reentry port since the body 201 adjacent these channels is well insulated from the hot regions 218, 220 and 238 by the cutouts 216, 217 and 228.

The escape of filtered material between the surfaces of the web 209 and the body portion 212 is prevented by virtue of the fact that in use a cooled belt extends from the cooling channel 225 in outlet port 206 via the cooling channel 214 and cold region 219 to cooling channel 214' and thence to cooling channel 227 so that a sealing plug forms over this cooled belt.

FIG. 10 of the accompanying drawings illustrates a modification of the device described above with reference to FIGS. 9A, 9B and 9C intended to result in the formation of a more efficient sealing plug in the backing drum reentry port. The same reference numerals are used in FIG. 10 as are used in FIGS. 9A to 9C to designate like parts. The principal difference between the modification of FIG. 10 and the arrangement already described is in the provision of two spring-loaded sealing shoes 240 and 241 mounted in grooves cut in the body portions 212 and 226. The shoes 240 and 241 are resiliently mounted in the grooves by sealing them upon thin silicon rubber sheet 242 so as to be able to take up slight angular movements of the sealing shoes 240 and 241. The shoes 240 and 241 are each formed with a thermally insulating channel 243 to divide each shoe into a "hot" portion which draws heat from the adjacent hot part of the body 201 and a "cold" portion which is cooled by the adjacent cooling channel; for example shoe 241 has a "hot" portion on the left-hand side of insulating channel 243 (as viewed in FIG. 10) which drawn heat from region 218 of the body portion 212 and a "cold" portion on the right hand side of insulating channel 243 which is cooled by cooling channel 214. The shoes 240 and 241 are formed of a good thermally conductive material such as beryllium copper. In operation, the "cold" portion of each of shoes 240, 241 is maintained at a temperature appropriate to solidifying the material being filtered so as to bring about the formation of a sealing plug of the material being filtered adjacent to the sealing shoe while the "hot" portion assists in softening any residual solid material still adhering to the drum 207.

FIGS. 11A, 11B and 11C show another filtering device which in many respects is similar to the device described above with reference to FIGS. 9A, 9B and 9C. The principal differences between the device of FIGS. 11A to 11C and that of FIGS. 9A to 9C reside in the precise arrangement and form of the cooling channels, heating elements and thermally insulating cutouts at the outlet and backing drum reentry ports, in the construction of the backing drum itself which in the FIGS. 11A to 11C device has not supporting web and no axle but instead is freely slidable in the body of the device, in the construction of the inlet port which in the FIGS. 11A to 11C device is formed integrally with the body of the device, and in the disposition of the backing drum. For the sake of simplicity the same reference numerals are used in the following description of the FIGS. 11A to 11C device as were used to designate like parts of the FIGS. 9A to 9C device.

The filtering device of FIGS. 11A, 11B and 11C of the accompanying drawings consists of a body 20 formed of two symmetrical halves which are clamped or welded together. FIG. 11A is a plan view of the device with one-half removed. The body 201 is formed with a filtering passage 202, inlet and outlet channels 203 and 204, and with integrally formed inlet and outlet ports 205 and 206 communicating with the channels 203 and 204 respectively.

A stainless steel cylindrical backing drum 207 having a multiplicity of perforations 208 through its surface is slidably mounted in a close fitting circular track cut in the body 201 viewed in FIG. 11A into body portions 212, 213, 226, 244 and 245. It is to be noted that the drum 207 projects beyond the right-hand edge of the body 201 as viewed in FIG. 11A so that as described hereafter it is necessary to make provision for a seal between the body portions 213 and 244. A breaker plate 246 is provided across the filtering passage 202 and is shaped to provide a bearing surface for the backing drum 207.

A continuous filter ribbon 211 is shown in situ extending through the inlet port 205 and inlet channel 203 into the filtering passage 202 where it is supported by the backing drum 207. The filter ribbon 211 leaves the filtering passage 202 via outlet channel 204 and integrally formed outlet port 206 for cleaning and returning to the inlet port 205.

No further description will be given of the outlet port 206 or of the reentry port defined between body portions 212 and 226 of the device, other than that the channeled cutouts 247 and 248 perform functions similar to those performed by channeled cutouts 216 and 217 of the FIGS. 9A to 9C device in defining "hot" and "cold" regions. Otherwise the FIGS. 11A to 11C device is substantially the same as the FIGS. 9A to 9C device in respect of these parts and it is considered that no further description thereof is necessary to obtain a full understanding of the device and of its mode of operation.

Consider the body portions 213, 244 and 245; body portion 245 has formed therein a channel 234 for coolant and a cutout 249 which provides a degree of thermal isolation between the part of body portion 245 which surrounds coolant channel 234, i.e., the "cold" part of body portion 245, and the remainder of body portion 245 which in use of the device is heated by heating element 231. Body portion 213 has a cutout 250 which extends throughout nearly the entire length of body portion 213 and divides it into two parts, one part on the left hand side of cutout 250 as viewed in FIG. 11A and a second part on the right-hand side. In operation the left-hand side part of body portion 213 is heated by heating element 251, and the right-hand side part is cooled by circulating coolant through coolant channels 235 and 252. Body portion 244 is similar to body portion 245 and has a coolant channel 253, a thermally insulating cutout 254 and a heating element 230.

The "cold" part of the body portion 245 (i.e., the part thereof adjacent the coolant channel 234) cooperates with the "cold" part of body portion 213 across the inlet channel 203 therefrom for the formation of a sealing plug to seal the inlet port 205, and the "cold" part of body portion 244 (i.e., the part thereof adjacent the coolant channel 253) cooperates with the "cold" part of body portion 213 across the circular track containing the backing drum 207 for the formation of a sealing plug to seal the backing drum in its track.

The device of FIGS. 11A, 11B and 11C is substantially identical in its mode of operation to that of the device of FIG. 9A, 9B and 9C. In use of the device for filtering heat-softened plastics material for example, temperature conditions may be established in the ports of the device by suitably controlling the coolant flow and the heat output of the heating elements such as to result in the formation of solidified plugs of plastics in the inlet port 205, in the outlet port 206, in the region of coolant channels 214' and 227 defining the backing drum reentry port and in the region between coolant channels 252 and 253. By suitably controlling the temperature conditions in the regions of the sealing plugs it can be arranged that continuous forwarding movement of the filter ribbon 211 can be obtained, the forwarding drive being derived from the action of the hydrostatic pressure of the plastics being filtered upon the sealing plug in the outlet port 206, under conditions providing for self-maintenance of the sealing plugs.

As with the device of FIGS. 9A, 9B and 9C, the device of FIGS. 11A, 11B and 11C obtains the advantage that the filter band or ribbon 211 is effectively connected to the backing drum 207 by the sealing plug in the outlet port 206 so that in forwarding the filter by hydrostatic pressure upon the sealing plug a positive drive is applied to both the filter band or ribbon 211 and the backing drum 207 which sets up no undue tensions or stresses in the filter.

FIG. 12 shows another embodiment of this invention which is similar in many respects to the device described above with reference to FIGS. 11A to 11C, the principal difference between the device of FIG. 12 and that of FIGS. 11A to 11C being that the filter band or ribbon is separated from the backing support within the body of device and exits from the device through a separate exit port adapted for the formation therein of a sealing plug of the substance being filtered.

In view of the similarily of the device of FIG. 12 to that of FIGS. 11A to 11C, no description of the device of FIG. 12 will be given herein except as regards the additional exit port through which the filter band or ribbon leaves the device after separation within the body of the device from the backing support. In all other respects the same reference numerals are used in FIG. 12 to designate parts which are similar to or the same as parts of the FIGS. 11A to 11C device and perform the same function as are used in FIGS. 11A to 111C. Referring then to FIG. 12, an exit port 400 is shown affixed to the body 201 of the device in such a position that the slotted channel 401 of the exit port 400 extends tangentially to the supporting surface of the backing drum 207, a slot 402 being formed through the body 201 of the device to provide communication between the filtering passageway 202 and the channel 401 in the exit port 400. As shown, the exit port 400 is formed with coolant channels 403 and heating elements 404 separated by thermally isolating waisted portions 405 and 406 from each other and from the body 201 of the device.

In operation, the device of FIG. 12 performs substantially identically to that of FIGS. 11A to 11C, except that it becomes necessary also to control conditions in the filter exit port 400 as well as in the inlet port 205 and the outlet port 206 to obtain the formation of a sealing plug therein and to ensure that the filter band or ribbon 211 is forwarded at a rate which is consistent with the speed of rotation of the backing drum 207. The disadvantage inherent in the need to control three sets of conditions rather than only two as in use of the device of FIGS. 11A to 11C is, to some extent, offset by the ease of separation of the filter band or ribbon 211 from the backing drum 207.

FIG. 13 is a sectional view of yet another form of filtering device according to this invention. The device of FIG. 13 differs from the already described devices principally in that as endless movable backing support it employs an endless multiple roller chain rather than a rotary drum.

As shown in FIG. 13 the filtering device consists of a body 261 formed with a passageway 262 through which, in use, a substance to be filtered is caused to flow in the direction indicated by the arrow. The body 260 is also formed with slotted inlet and outlet channels 263 and 264 which communicate respectively with slotted inlet and outlet ports 265 and 266. A continuous, and preferably endless, filter ribbon 267, formed for example of Dutch weave stainless steel cloth, is shown in situ extending through the inlet port 265, through the inlet channel 263, across the filtering passage 262 and out of the filtering passage 262 via outlet channel 264 and outlet port 266.

For supporting the filter ribbon 267 across the filtering passageway 262 there is provided a backing support consisting of a multiple roller chain comprising an endless train of rollers 268 which roll upon a central core 269 disposed in the passageway 262, the rollers 268 being interconnected by links 270 which hold them apart to permit the substance being filtered to pass therebetween and upon which the filter band or ribbon is supported. The core 269 consists of two posts 271 (shown in cross section in FIG. 13) which support therebetween a number of spaced plates 272 only one of which can be seen in FIG. 13.

In contrast to the arrangement described in FIGS. 6 and 7 the roller chain consisting of rollers 268 and links 270 is not wholly contained within the filtering passage 262 but instead passes out of the outlet channel 264 and outlet port 266 together with the filter band or ribbon 267, and then passes round a curved path 273 which connects with a reentry port 274 and with a reentry channel 275 which communicates with the filtering passage 262. The rollers 268 thus run endlessly around a closed-loop path throughout part of which the rollers 268 are in intimate contact with the filter band or ribbon 267 and throughout the remainder of which they are returning.

As with the previously described filtering devices, the smaller diameter circles in FIG. 13 represent channels for the circulation of coolant, and the larger diameter circles represent heating elements. In operation of the device of FIG. 13 for filtering a heat-softened plastics material for example, sealing plugs of solidified or semisolidified plastics are formed in the inlet port 265, in the outlet port 266 at a region between the two coolant channels thereof and in the reentry port 274 at a region between the four coolant channels thereof. It will be recognized that the waisted portions 276 of the respective ports is for enhancing the thermal isolation of the "hot" and "-cold" parts thereof.

By controlling the temperature conditions prevailing at the inlet, outlet and reentry ports 265, and 274 respectively a situation can be established resulting in a continuous forwarding movement of the filter band or ribbon 267 with self-maintenance of the sealing plugs, the forwarding drive being applied directly to the roller chain as a result of the action of the hydrostatic pressure of the material being filtered upon the sealing plug in out port 266.

Delamination of the filter band or ribbon 267 from the roller chain to which it is effectively connected by the sealing plug in the outlet port 266 is effected by reheating the material forming the plug. A source of radiant heat 277 can be provided to assist delamination although this is not strictly necessary in view of the heating elements provided in the body of the device adjacent the exit of the outlet port 266.

As with the previously described filtering devices, the device of FIG. 13 obtains the result that since the filter band or ribbon is effectively connected to the supporting roller chain at the outlet port where the forwarding drive originates, no undue tension or stresses are set up in the filter during forwarding.

FIG. 14 shows a filtering device very similar to that just described with reference to FIG. 13, and the same reference numerals are used for the same or similar parts in the two Figures. Likewise the smaller diameter circles designate cooling channels and the larger diameter circles designate heating elements.

The difference between the devices of FIGS. 13 and 14, apart from the angular disposition of the inlet and outlet ports and channels relative to the filtering passageway, is that in the FIG. 14 device the central core 269 consists of a number of spaced parallel plates 272 (only one of which can be seen in FIG. 14) fixed to an axle 278 journaled at each end in the body 261 of the device. The device of FIG. 14 thus combines the features of a rotary drum type of backing support (as in the FIGS. 9A to 9C device) with the features of the roller chain type of backing support to obtain a more freely movable arrangement. In all other respects the FIG. 14 device is similar to the FIG. 13 device and therefore no further description of it is considered to be necessary.

Although the devices described herein with reference to FIGS. 9A to 9C, 11A to 11C, 13 and 14 are designed for operation with sealing plugs formed of the substance being filtered, it is to be clearly understood that with only very slight modification they would be suitable for operation in accordance with the improved process according to this invention whereby the sealing plug in at least one of the filter inlet and outlet ports is formed of a suitable substance different from that being filtered. To enable these devices to be so operated, it is necessary only to provide a bore in the body of the device for the admission of suitable sealing substances into whichever sealing port is to have a sealing plug formed of the different substance: such bores are shown in FIGS. 9A, 11A, 13 and 14 in dotted lines and each is designated by the reference numeral 300. As described previously herein with reference to the embodiment of this invention shown in FIGS. 1 and 2 of the accompanying drawings means (such as is shown in FIG. 3A or FIG. 3B) may be provided for detecting whether sealing substance or substance being filtered is present at a particular point in the inlet or outlet port channel, and there may also be provided an arrangement (such as is shown schematically in FIG. 1 and designated by reference numerals 45, 46 and 47) for recovering sealing substance from the extruded plug, filtering it and returning it for recirculation.

There have thus been described filtering devices which obtain a considerable improvement in forwarding of the filter. Although the devices described in detail employ the hydrostatic pressure of the substance being filtered to derive the filter-forwarding force, it will be appreciated that it would easily be possible to drive the filter backing support mechanically. It is also to be understood that other changes may be made to the specific forms of the devices described, particularly changes in accordance with the teachings of U.S. Pat. application No. 647,435 without departing from the scope of this invention. Thus for example the filter band or ribbon could be a laminated arrangement consisting of a filtering layer laminated with one or more reinforcing layers such as of perforated or woven stainless steel.

I claim:

1. A process of filtering a substance flowing through a passage including the steps of introducing a filter in the form of a filter band or ribbon by passing it through inlet and outlet ports flanking said passage so that a part of the filter extends across said passage, forcing the substance through the filter part in the passage to filter said substance, providing a flowable sealing substance in said inlet and outlet ports, maintaining temperature conditions at said inlet and outlet ports resulting in the formation within said ports of sealing plugs of a said flowable sealing substance of adequate rigidity to prevent substantial leakage at said ports of the substance being filtered and, effecting movement of said filter through said ports under conditions providing for self-maintenance of the said sealing plugs to introduce another part of said filter band or ribbon into said passage, the flowable sealing substance forming the sealing plug within at least one of said ports being other than the substance being filtered.

2. A process as claimed in claim 1 wherein the flowable sealing substance forming the sealing plugs at both said inlet and said outlet ports is other than the substance being filtered.

3. A process as claimed in claim 1 wherein the flowable sealing substance is selected to have a different specific gravity than the substance being filtered so that a stable interface can be established between the sealing substance and the substance being filtered.

4. A process as claimed in claim 1 including introducing a barrier medium between the sealing plug substance and the substance being filtered in order to separate the two said substances.

5. A process as claimed in claim 1 including the step of detecting the presence or absence of sealing substance at a predetermined location in at least one of said inlet and outlet ports, and, in dependence upon such detection, automatically controlling the supply of sealing plug substance to the sealing port.

6. A filtering device including a body defining a passage through which a substance to be filtered can be caused to flow and slotted inlet and outlet ports flanking said passage through which a filter in the form of a band is passed and can be moved to introduce different parts of said filter across said passage, said ports being adapted for the formation therein, in use, of sealing plugs of a flowable sealing without substantial leakage of said substance being filtered, means to provide temperature conditions at said ports to form said plugs, a bore in said body communicating with one of said ports at a point downstream of said passage in relation to the direction of flow of substance to be filtered entering said one port from said passage, and means for introducing into said bore a flowable sealing substance other than the substance being filtered for forming said sealing plugs.

7. A filtering device as claimed in claim 6 wherein a second such bore is provided in the body of the device, said second bore communicating with the other of said ports and serving for the introduction into said other port of a flowable sealing substance other than the substance being filtered.

8. A filtering device as claimed in claim 6, including, means for detecting the presence or absence of flowable sealing substance at a predetermined location in said port upstream of the point of communication therewith of the said bore, pumping means for supplying sealing substance to said bore, and means responsive to said detecting means for controlling the pumping means to control the supply of flowable sealing substance to the port.

9. A filtering device as claimed in claim 8 wherein the detecting means includes a source of radiant energy and an electronic phototransducer disposed at opposite ends of a bore formed through the body of the device to intersect said port at said predetermined location therein, said bore being closed to prevent leakage therethrough of substance in the port by material which is transparent to the radiation from said source.

10. A filtering device as claimed in claim 8 wherein said detecting means includes two electrodes which extend into the port at said predetermined location to enable the electrical conductivities or dielectric constants of the substance in the port at that location to be sensed.

11. A filtering device including a body defining a passage through which a substance to be filtered can be caused to flow, and slotted inlet and outlet ports flanking the passage through which a filter in the form of a band is passed and can be moved to introduce different parts of said filter across said passage, means for maintaining temperature conditions at said ports for the formation therein, in use, of sealing plugs of a flowable sealing substance of adequate rigidity to permit movement of said filter through said ports without substantial leakage of substance being filtered, the device further including an endless movable backing support mounted within said passage for supporting the filter band, the said movable backing support being movable in the direction of filter movement so that the said support acts as a movable bearing for the filter band and being apertured to limit its resistance to the flow of substance being filtered through said passage.

12. A device as claimed in claim 11 wherein said movable backing support is a rotatable drum mounted for rotation about an axis transverse to the direction of filter movement.

13. A device as claimed in claim 11 wherein said drum consists of a number of spaced plates centrally mounted upon or formed integrally with and perpendicular to an axle journaled at each end in the wall of the filtering passageway.

14. A device as claimed in claim 13 wherein a takeoff comb is provided at the filter-exit side of the filtering passageway for taking off the filter from the surface of the backing drum, said takeoff comb being mounted tangentially to the surface of the backing drum in a filter exit channel to one side of the filtering passageway and having teeth which extend between the said plates of the backing drum.

15. A device as claimed in claim 11 wherein said endless backing support includes an endless train of rollers, said rollers being arranged to permit passage of the substance being filtered therebetween and being constrained to roll around a predetermined path over part of which they serve as a backing support for a filter band or ribbon entrained across the filtering passage.

16. A device as claimed in claim 15 wherein the backing support further includes a perforated cylinder supported by means of said rollers to be rotatable thereon, the said perforated cylinder being so disposed as to lie between the rollers and the filter band in use of the device.

17. A device as claimed in claim 15 wherein said rollers are arranged to roll upon and around a core member in the filtering passageway, said core member being apertured to limit its resistance to the flow through the filtering passage of the substance being filtered.

18. A device as claimed in claim 17 wherein said core member is itself rotatable.

19. A device as claimed in claim 15 wherein each end of each roller is located in a grooved track so that the rollers roll with both their ends supported in the said tracks.

20. A device as claimed in claim 15 wherein the rollers are in the form of a roller chain consisting of an endless train of rollers interconnected by links which hold them apart and permit the substance being filtered to pass therebetween.

21. A device as claimed in claim 11 wherein the endless moving backing support supports the filter band across the filtering passage and is mounted for movement out of the filtering passageway through a slotted outlet port in the said body, the said backing support being directed to reenter the filtering passageway via a slotted reentry port.

22. A device as claimed in claim 21 wherein the backing support is arranged to leave the filtering passage with the filter band through the same outlet port before being directed to reenter said passage thereby effecting separation of the filter band from the backing support.

23. A device as claimed in claim 21 wherein the backing support is in the form of a hollow cylindrical drum having a multiplicity of perforations through its curved surface and mounted in the filtering passageway so that the curved surface of the drum passes out of the passageway and reenters the passageway on at least the filter exit side thereof.

24. A device as claimed in claim 23 wherein the said drum is supported by means of a circular web affixed within the drum and extending transversely to the curved surface of the drum, the said web being secured to an axle journaled at each end in the body of the device.

25. A device as claimed in claim 23 wherein said backing drum is freely slidably mounted in two close-fitting circular tracks cut in the body of the device, one on either side of the filtering passageway, a breaker plate being provided across the passageway and being shaped to provide a bearing surface for the part of the backing drum which serves to support the filter across the passageway.

26. A device as claimed in claim 23 wherein the part of the body of the device between the filtering passageway and the curved surface of the backing drum on the filter exit side of the passageway is formed with means for heating and means for cooling predetermined regions thereof, thermally insulating cutouts being provided to delineate such regions, which heating and cooling means cooperate with other heating and cooling means formed in the body of the device at regions across the adjacent curved surface of the backing drum from the first-mentioned regions for establishing conditions necessary for the formation of sealing plugs between such cooperating regions.

27. A device as claimed in claim 23 wherein the backing drum leaves and reenters the filtering passageway via a curved channel formed in the body of the device, and such curved channel becomes progressively wider towards the passageway in the region thereof which constitutes the reentry port to ensure that the presence of a sealing plug in the reentry port causes as little resistance as possible to rotation of the backing drum.

28. A device as claimed in claim 27 wherein two spring-loaded sealing shoes are mounted in grooves cut in the body of the device on either side of the backing drum at the reentry port, the said shoes being shaped to bear against the inner and outer curved surfaces of the backing drum so as to result in a more efficient seal in the backing drum reentry port.

29. A device as claimed in claim 28 wherein each said sealing shoe has a thermally insulating cutout so as to divide each shoe into a hot portion and a cold portion, the temperature of the shoes being determined by conduction from adjacent parts of the body of the device, the hot portion of each shoe being furthest from the filtering passageway so as, in operation of the device, to assist in the softening of hardened material adhering to the backing drum necessary for ease of rotation of the backing drum and the cold portion being nearest the filtering passageway so as to bring about the formation of a sealing plug.

30. A device as claimed in claim 21 including drive means mechanically coupled with the filter backing support outside of the body of the device for driving the backing support to impart forwarding movement to the filter band.

31. A device as claimed in claim 21 wherein the outlet port through which both the filter band and the backing support leave the filtering passage is of greater cross-sectional area than the inlet port whereby, in use, the hydrostatic pressure of the substance being filtered in the filtering passage acting upon the sealing plugs in the inlet and outlet ports provides a net force in a direction such as to assist movement of the filter band, which force is transmitted to the filter band and to the backing support by virtue of the effective connection of the sealing plug to the filter and backing support resulting from the permeation of the substance of the sealing plug through the interstices of the filter and the apertures which are provided in the backing support for enabling the flow of substance being filtered therethrough, the arrangement being such that a positive drive is applied directly to the backing support with extrusion of the sealing plug through the outlet port so that the filter is forwarded without having to be put under any direct tension.

* * * * *